(12) United States Patent
Takimoto et al.

(10) Patent No.: US 7,055,851 B2
(45) Date of Patent: Jun. 6, 2006

(54) KNEE PROTECTING AIRBAG DEVICE

(75) Inventors: Masahiro Takimoto, Aichi-ken (JP);
Yoshio Mizuno, Aichi-ken (JP);
Kazumasa Suzuki, Aichi-ken (JP);
Toru Koyama, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 68 days.

(21) Appl. No.: 10/299,657

(22) Filed: Nov. 20, 2002

(65) Prior Publication Data

US 2003/0094795 A1 May 22, 2003

(30) Foreign Application Priority Data

Nov. 20, 2001 (JP) .............................. 2001-358077
Apr. 25, 2002 (JP) .............................. 2002-124735

(51) Int. Cl.
*B60R 21/205* (2006.01)
*B60R 21/231* (2006.01)
*B60R 21/237* (2006.01)

(52) U.S. Cl. ..................................... 280/730.1; 280/732

(58) Field of Classification Search ............. 280/728.2, 280/730.1, 732, 743.1; B60R 21/16, 21/20, B60R 21/22
See application file for complete search history.

(56) References Cited

U.S. PATENT DOCUMENTS

| | | | | |
|---|---|---|---|---|
| 4,948,168 A | * | 8/1990 | Adomeit et al. ............. | 280/732 |
| 5,360,231 A | * | 11/1994 | Adams ..................... | 280/728.2 |
| 5,433,472 A | * | 7/1995 | Green et al. ............. | 280/728.2 |
| 5,513,877 A | * | 5/1996 | MacBrien et al. .......... | 280/732 |
| 5,533,750 A | * | 7/1996 | Karlow et al. ............ | 280/730.2 |
| 5,553,886 A | * | 9/1996 | Gunn et al. .............. | 280/728.2 |
| 5,613,704 A | * | 3/1997 | White et al. .............. | 280/740 |
| 5,813,692 A | * | 9/1998 | Faigle et al. ............. | 280/728.2 |
| 5,887,891 A | | 3/1999 | Taquchi et al. | |
| 5,947,510 A | * | 9/1999 | Athon et al. ............. | 280/728.2 |
| 6,149,568 A | * | 11/2000 | Ross et al. ................. | 493/458 |
| 6,431,583 B1 | * | 8/2002 | Schneider ................ | 280/728.2 |
| 6,464,255 B1 | * | 10/2002 | Preisler et al. ............. | 280/752 |
| 6,471,238 B1 | * | 10/2002 | Ishikawa et al. ......... | 280/728.3 |
| 2002/0130492 A1 | * | 9/2002 | Webber et al. ........... | 280/728.2 |
| 2002/0149187 A1 | * | 10/2002 | Holtz et al. ................ | 280/749 |

FOREIGN PATENT DOCUMENTS

| | | |
|---|---|---|
| DE | 298 07 424 U1 | 10/1998 |
| DE | 199 00 592 A1 | 7/2000 |

(Continued)

OTHER PUBLICATIONS

Notice of Rejection of Oct. 24, 2005 issued from Japanese Patent Office for the corresponding Japanese application No. 2002-124735 (copy of original document is enclosed).

*Primary Examiner*—Paul N. Dickson
*Assistant Examiner*—Laura B. Rosenberg
(74) *Attorney, Agent, or Firm*—Posz Law Goup, PLC

(57) ABSTRACT

A knee protecting airbag device in which a folded airbag and an inflator are housed and held in a case. In the inflator, a connection portion to be connected with a connector having leadwires connected is exposed to the outside of the case through insert holes formed in the airbag and in the case. The through hole of the case has an internal diameter size smaller than the external diameter size of the general portion of the inflator near the connection portion of the inflator.

9 Claims, 25 Drawing Sheets

FOREIGN PATENT DOCUMENTS

| | | |
|---|---|---|
| DE | 20106599 U1 | 9/2001 |
| EP | 684 167 A1 | 11/1995 |
| EP | 818 360 A1 | 1/1998 |
| EP | 1188624 A1 | 3/2002 |
| GB | 2 263 671 A | 4/1993 |
| JP | A-S58-110339 | 6/1983 |
| JP | A-5-208646 | 8/1993 |
| JP | 06328990 A * | 11/1994 |
| JP | A-H07-329676 | 12/1995 |
| JP | A-8-301054 | 11/1996 |
| JP | A-9-123863 | 5/1997 |
| JP | 9-193731 A | 7/1997 |
| JP | 9-207699 A | 8/1997 |
| JP | A-9-207700 | 8/1997 |
| JP | A-10-59103 | 3/1998 |
| JP | A-10-71911 | 3/1998 |
| JP | A-H10-71911 | 3/1998 |
| JP | A-10-315894 | 12/1998 |
| JP | 11-11245 A | 1/1999 |
| JP | 11048891 A * | 2/1999 |
| JP | A-H11-48890 | 2/1999 |
| JP | A-H11-105660 | 4/1999 |
| JP | A-11-240411 | 9/1999 |
| JP | A-H11-240411 | 9/1999 |
| JP | 11-278196 A | 10/1999 |
| JP | A-2000-225911 | 8/2000 |
| JP | A-2001-114060 | 4/2001 |
| JP | A-2003-205816 | 7/2003 |
| WO | WO 01/81127 A1 | 11/2001 |
| WO | WO 02/04261 A1 | 1/2002 |
| WO | WO 02/04262 A1 | 1/2002 |

* cited by examiner

SECTION OF VIII-VIII

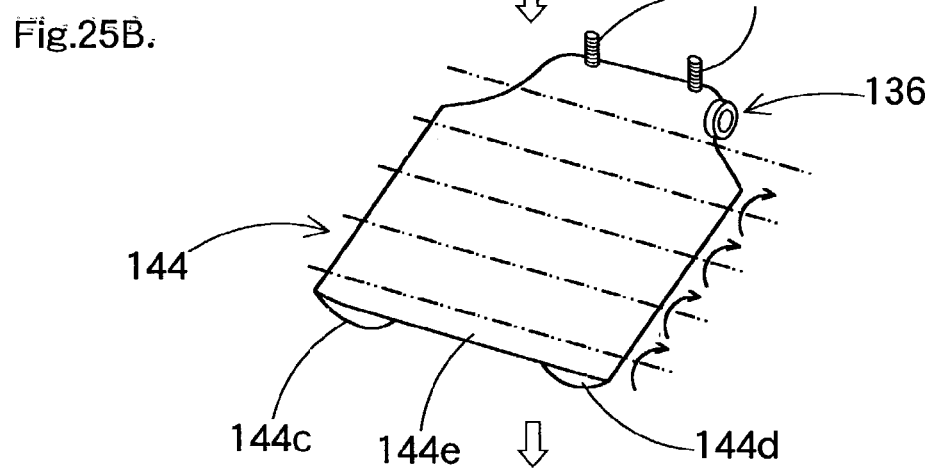
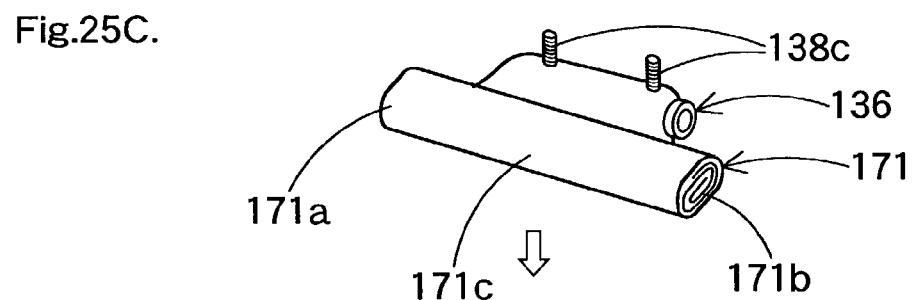
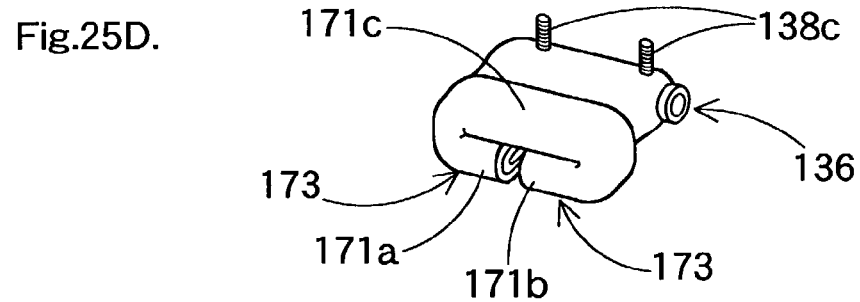

KNEE PROTECTING AIRBAG DEVICE

The present application claims priority to Japanese patent application of Takimoto et al., filed Nov. 22, 2001, No.2001-358077, and Japanese patent application of Mizuno et al., filed Apr. 25, 2002, No.2002-124735, the entirely of each is hereby incorporated into the present application by this reference.

BACKGROUND OF THE INVENTION

1. Field of the Invention

The present invention relates to a knee protecting airbag device, in which an airbag to be expanded and inflated by admitting an inflating gas can protect the knees of a passenger such as a driver or a person seated on the passenger's seat.

2. Description of the Related Art

In the prior art, a device for protecting the knees of a passenger such as a driver is disclosed in Unexamined Published Japanese Patent Application No. 31589/1998. This airbag device includes: an airbag folded in an expandable and inflatable manner in front of the knees of the seated passenger; an inflator for feeding an inflating gas to the airbag; and a case for housing and holding the folded airbag and the inflator. Moreover, the inflator is housed in a portion of the airbag that is held in the case when the airbag is completely expanded and inflated.

When this device is active, the airbag is protruded to the rear of the vehicle from the case when fed with the inflating gas, so that it can be expanded and inflated to protect the knees of the passenger.

From the viewpoint of assembling workability, moreover, the knee protecting airbag device preferably comprises an airbag, inflator and case which form one assembly and are integrated before being mounted on the vehicle.

However, the airbag device of this publication is not clear regarding the structure of the lead wires for inputting an activation signal from an airbag activation circuit mounted on the vehicle to the inflator. Therefore, this airbag device can be improved if activation signal inputting lead wires are smoothly connected with the inflator after the airbag and the inflator were housed in the case.

Another device for protecting the knees of the passenger such as the driver is disclosed in WO 02/04262. This airbag device is arranged on the lower side of the column cover below the steering wheel. When activated, moreover, the airbag is expanded and inflated upward from the lower side of the column cover below the steering wheel so that the knees of the driver may be protected by the airbag when inflated.

In the airbag device thus constructed, the airbag is folded and housed in the case whose side facing the rear of the vehicle has been opened. And, the airbag is protruded to the rear of the vehicle from the opening of the case and is expanded upward while being unfolded, to complete its inflation.

In connection with the behavior of the airbag to be protruded from the case to complete its inflation, the airbag is desirably expanded upward while suppressing its protrusion to the passenger. Especially in case the case has its axial direction approximating the horizontal direction, the airbag is liable to be excessively protruded to the passenger. This is because the airbag is protruded along the axis of the case.

SUMMARY OF THE INVENTION

A first object of the invention is to provide a knee protecting airbag device, which can easily connect lead wires for inputting an activation signal to an inflator even after the airbag and the inflator are housed in the case.

A second object of the invention is to provide a knee protecting airbag device, which can protrude the airbag to the rear of the vehicle from the case while suppressing the protrusion to the passenger, thereby to expand and inflate the airbag upward as smoothly as possible.

The first object of the invention can be achieved by a knee protecting airbag device having the following construction:

A knee protecting airbag device comprising:

a folded airbag; an inflator for feeding an inflating gas to the airbag; and a case for housing and holding the airbag folded and the inflator, wherein the airbag can be expanded and inflated to the front of the knees of a seated passenger;

wherein the inflator is housed in a portion of the airbag which is held in the case after the airbag has completed its inflation, wherein the inflator is connected with lead wires for inputting an activation signal, wherein the inflator is constructed such that its connection portion to be connected with the lead wires is exposed to the outside of the case through insert holes formed in the airbag and said case, and wherein the insert hole of the case has an internal diameter size made smaller than the external diameter size of the connection portion of the inflator or the general portion of the inflator around the connection portion.

In the knee protecting airbag device of the aforementioned construction, the inflator exposes its connection portion to be connected with the lead wires to the outside of the case through the insert holes formed in the airbag and the case, even if the folded airbag and the inflator are held in the case. Therefore, the lead wires for inputting the activation signal can be easily connected with the exposed connection portion of the inflator.

Moreover, the internal diameter size of the insert hole of the case is set smaller than the external diameter of the connection portion of the inflator or the general portion around the connection portion. Even if the inflator shifts when the airbag is activated, therefore, the inflator is prevented from going out of the insert hole of the case.

Moreover, the air in the case at the initial stage of the action of the inflator can be released from the insert hole of the case. This makes it possible to prevent the case from being deformed by the air in the case at the initial stage of the inflation of the airbag.

In the knee protecting airbag device of the aforementioned construction, therefore, the lead wires for inputting the activation signal can be easily connected with the inflator, even after the airbag and the inflator are housed in the case. In the knee protecting airbag device thus constructed, moreover, the inflator can be prevented from popping unnecessarily out from the insert hole of the case. It is also possible to prevent the case from being deformed at the initial stage of the inflation of the airbag.

Moreover, the knee protecting airbag device of the aforementioned construction preferably has a construction, wherein the connection portion of the inflator is protruded to the outside of the case through the insert hole of the case, and wherein the general portion near the connection portion of the inflator is made to have a larger external diameter size than the internal diameter size of the insert hole of the case.

In this construction, the connection portion of the inflator is protruded to the outside of the case, and it is easy to observe the connection portion visually. Therefore, it is easier to connect the lead wires for inputting the activation signal. In this construction, on the other hand, the general portion of the inflator around the connection portion is given a larger external diameter size than the internal diameter size of the insert hole of the case, and the connection portion itself is inserted into the insert hole of the case. Even if the inflator in action shifts perpendicularly away from the axis of the insert hole of the case, the inner circumference of the case insert hole constrains the position of the connection portion. Therefore, the held position of the inflator in the case can be stabilized to stabilize the feed direction of the inflating gas into the airbag.

Moreover, the knee protecting airbag device of the aforementioned construction preferably has a construction wherein the inflator is formed into a column shape, in which its axial direction is arranged in the transverse direction of the vehicle, and is mounted on the vehicle such that the connection portion is arranged on one axial end of the inflator toward the vehicular outer side in the transverse direction of the vehicle.

In this construction, when the airbag, inflator and case form one assembly and are integrated before being mounted on the vehicle, the lead wires for inputting the activation signal can be connected with the inflator from the vehicular outer side having the comparatively sufficient space. This makes it easy to connect the lead wires after the airbag assembly is mounted on the vehicle.

Moreover, the second object of the invention can be achieved by the knee protecting airbag device having the following construction:

A knee protecting airbag device, wherein a knee protecting airbag folded is housed in a case arranged in front of the knees of a seated passenger and is protruded toward the rear of the vehicle from the case when an inflating gas flows in, so that it is expanded and inflated upward while being unfolded, wherein the case is provided with a surrounding wall portion of a generally square tube shape opened on the rear side of the vehicle, and a bottom wall portion for closing the vehicular front side of the surrounding wall portion, and wherein vertical height of the case near the opening is larger than that of the bottom wall portion when the airbag is expanded and inflated, and the periphery of said opening is expanded.

In the airbag device, the airbag is inflated at first in the case when the inflating gas flows into the airbag from the inflator. After this, the airbag is protruded to the rear of the vehicle from the case opening while pushing the surrounding wall portion of the case.

In the airbag device, when the airbag is expanded and inflated, the case is so expanded at the opening that the vertical height near the opening is larger than the vertical height of the bottom wall. Therefore, the airbag is protruded to the rear of the vehicle from the case opening while being unfolded.

At this time, for example, in the airbag device having the airbag housed in the case in which the opening side in the surrounding wall portion is not expanded, that is, in which the opposed wall of the surrounding wall portion at the opening are parallel with each other, the airbag admits the inflating gas so that its folded portion is protruded due to the rise in internal pressure, from the case opening toward the rear of the vehicle. And, the airbag which has protruded from the case expands while unfolding in the free space. In the knee protecting airbag device of the aforementioned construction, on the contrary, the airbag unfolds while it still is in the case, protruding from the opening toward the rear. Therefore, the airbag can be protruded from the case opening while rise in its internal pressure is suppressed. Especially, the knee protecting airbag device of the aforementioned construction can make the protruding velocity of the airbag toward the rear of the vehicle lower than that of the case in which the airbag is housed in the case without an expanded opening. Therefore, the airbag can be expanded and inflated while suppressing the amount of protrusion to the rear side of the vehicle.

In the knee protecting airbag device of the aforementioned construction, therefore, the airbag can be protruded to the rear of the vehicle from the case while suppressing the protrusion to the passenger and can be expanded and inflated upward as smoothly as possible.

Here, it is preferable that the vertical height $h1$ in the vicinity of the opening of the case is set within a range of $1 < h1/h2 \leq 1.8$ where $h2$ is the vertical height of the bottom wall portion. In the case of the knee protecting airbag device covered with an airbag cover facing the rear of the vehicle and also a door portion which can be pushed and opened by the airbag protruded toward the rear of the vehicle from the case, this height setting is made to make it possible for the door portion to be opened smoothly by the airbag protruded toward the rear of the vehicle. If the value of $h1/h2$ exceeds 1.8, specifically, the opening of the door portion may be delayed to increase the time period from the start to the completion of the inflation of the airbag.

Moreover, the knee protecting airbag device of the aforementioned construction preferably has a construction, wherein the opening side edge of lower wall portion of said case surrounding wall portion is arranged higher than the bottom wall edge of the lower wall portion.

If the knee protecting airbag device is given the aforementioned construction, the airbag is guided by the lower wall portion of the case surrounding wall portion and is easily expanded and inflated upward. Therefore, the airbag can be expanded along the rear face of a member attached to body such as the column cover.

Here, the construction in which the opening side portion of the case surrounding wall portion is expanded when the airbag is expanded and inflated may be modified such that the opening side is expanded from the beginning. Moreover, the case may also be constructed such that the opening side is expanded when the airbag is expanded and inflated, by using the pushing force of the airbag to deform the upper wall portion.

On the other hand, the second object of the invention can also be achieved by a knee protecting airbag device having the following construction:

A knee protecting airbag device, wherein a knee protecting airbag folded is housed in a case arranged in front of the knees of a seated passenger and is protruded rearward of a vehicle from the case when an inflating gas flows in, so that it is expanded and inflated upward while being unfolded, wherein the case is provided with a surrounding wall portion of a generally square tube shape opened on the rear side of the vehicle, and a bottom wall portion for closing the vehicular front side of the surrounding wall portion, wherein the two transverse edges of the portion of the airbag folded with transverse fold lines are folded over either onto the upper side or beneath the lower side of the folded airbag near its central portion, and wherein the case is made deformable at its upper wall portion or lower wall portion of the surrounding wall portion so that the vertical height in the vicinity of the opening may be enlarged when the airbag is expanded and inflated.

In the knee protecting airbag device of the aforementioned construction, the upper wall portion or the lower wall portion of the surrounding wall portion of the case is deformed if the airbag is inflated at the initial stage, because the airbag pushes the upper wall portion and the lower wall portion of the case surrounding wall portion while unfolding the two transverse edge sides. And, the airbag is unfolded in the deformed case to protrude to the rear of the vehicle from the case opening. Therefore, the airbag can be protruded from the case opening while suppressing the rise in its internal pressure. At this time, moreover, the case is not deformed to reduce the transverse width size of the vicinity of the opening. Therefore, the airbag are protruded from the case opening while unfolded the transverse folds. Then, the airbag is expanding to the right and left. In the knee protecting airbag device of the aforementioned construction, the airbag is protruded while being widened in the transverse directions, from the case opening by lowering the vehicular rearward protruding velocity to suppress the protrusion to the side the rear side of the vehicle.

In the knee protecting airbag device of the aforementioned construction, too, the airbag can also be protruded to the rear of the vehicle from the case while suppressing the protrusion toward the passenger side. And, the airbag can be expanded and inflated upward as smoothly as possible.

Moreover, the knee protecting airbag device of the aforementioned construction preferably has a construction wherein the wall portion of the surrounding wall portion located on the side of the airbag on which the two transverse edges are folded is made deformable.

With this construction, at the initial stage of inflation of the airbag, the wall portion of the case are pushed by the folded left and right sides of the airbag is deformed. Therefore, the airbag unfolds its left and right sides folded portions quickly as it causes the deformation of the wall portion. As a result, the airbag can be quickly expanded and inflated.

Moreover, the knee protecting airbag device of the aforementioned construction preferably has a construction wherein the airbag is folded such that the two transverse edge sides are folded beneath the lower side of the folded portion near the central portion of the airbag.

At the initial stage of the expansion and inflation of the airbag, therefore, the central portion of the folded portion folded with transverse fold lines (here called the "first folded portion") is held down by the two folded portions folded beneath the lower side (as will be called the "second folded portions") so that it is prevented as much as possible from inflating upward until the two second folded portions are turned upward and unfolded to restore their position transversely flush with the central portion of the first folded portion. In other words, the first folded portion is unfolded generally uniformly along the transverse direction of the airbag after the second folded portions are made generally flush in the transverse direction with the central portion of the first folded portion. Therefore, the airbag can be expanded in a transversely more extended state.

BRIEF DESCRIPTION OF THE DRAWINGS

FIGS. 25A to 25D are schematic diagrams showing the steps of folding an airbag to be used in the fifth embodiment.

DESCRIPTION OF THE PREFERRED EMBODIMENTS

Figure 1:
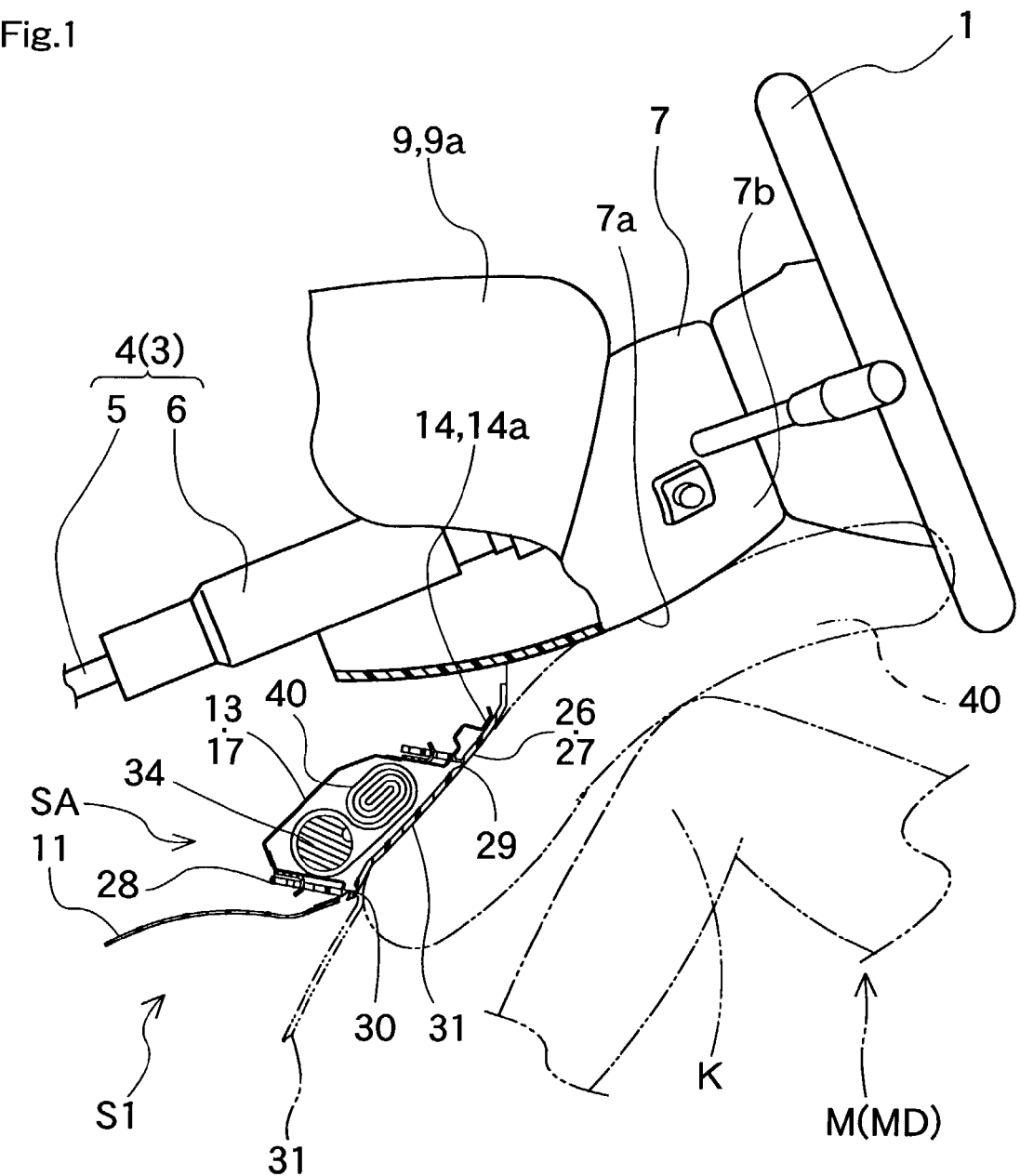
FIG. 1 is a schematic longitudinal section taken in the longitudinal direction of a vehicle and showing the used state of a knee protecting airbag device according to a first embodiment of the invention.

The invention will be described below by way of embodiments shown in the drawings. In addition, the invention is not limited to the embodiments. All modification within the requirements of the claims and equivalents with respect to the requirements should be included in the scope of the claims.

One embodiment of the invention will be described with reference to the accompanying drawings.

The first description is of airbag devices S1 to S3 capable of achieving the first object of the invention.

Figure 2:
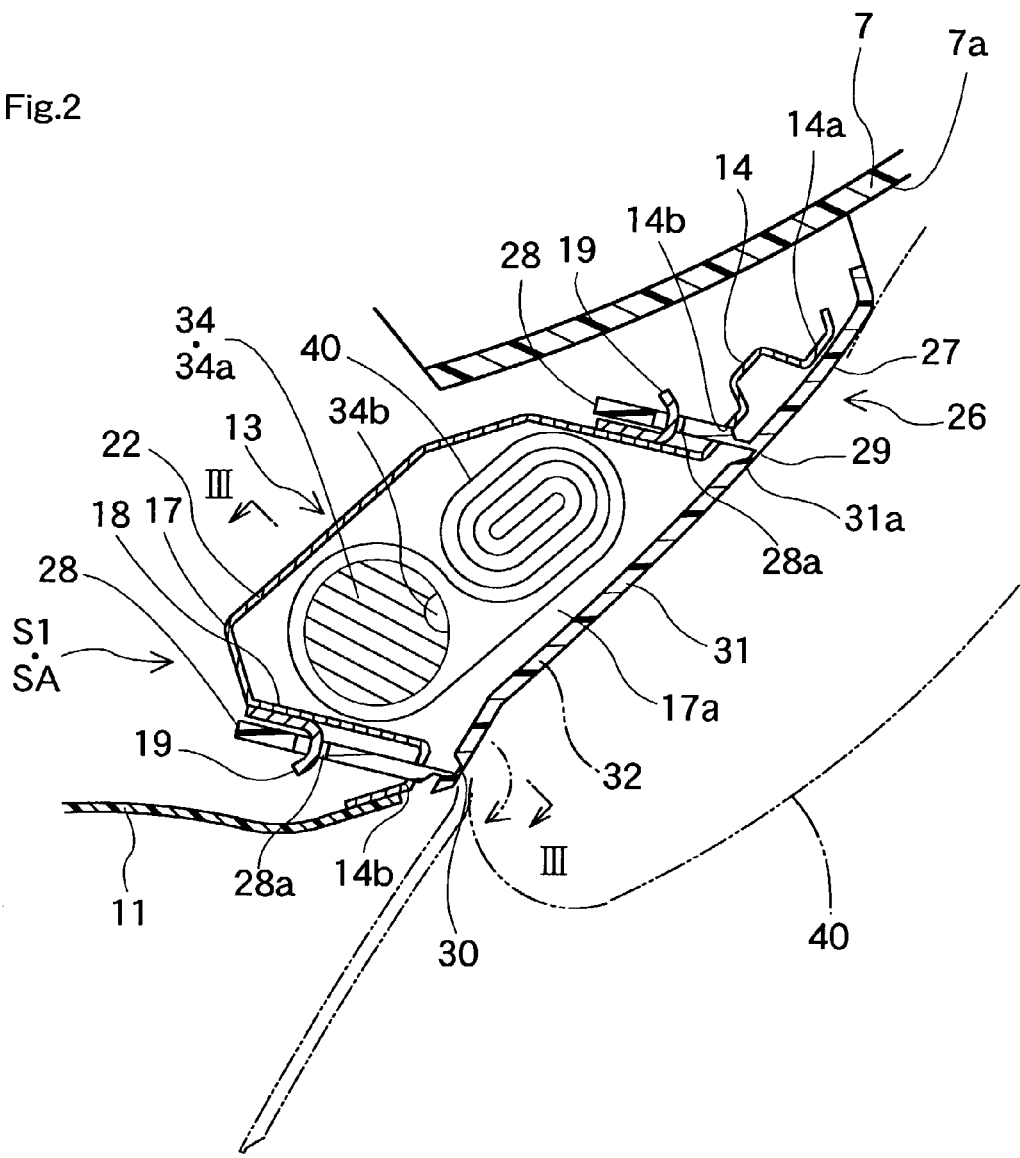
FIG. 2 is an enlarged schematic longitudinal section of the knee protecting airbag device of the first embodiment in the vehicular longitudinal direction.
Figure 3:
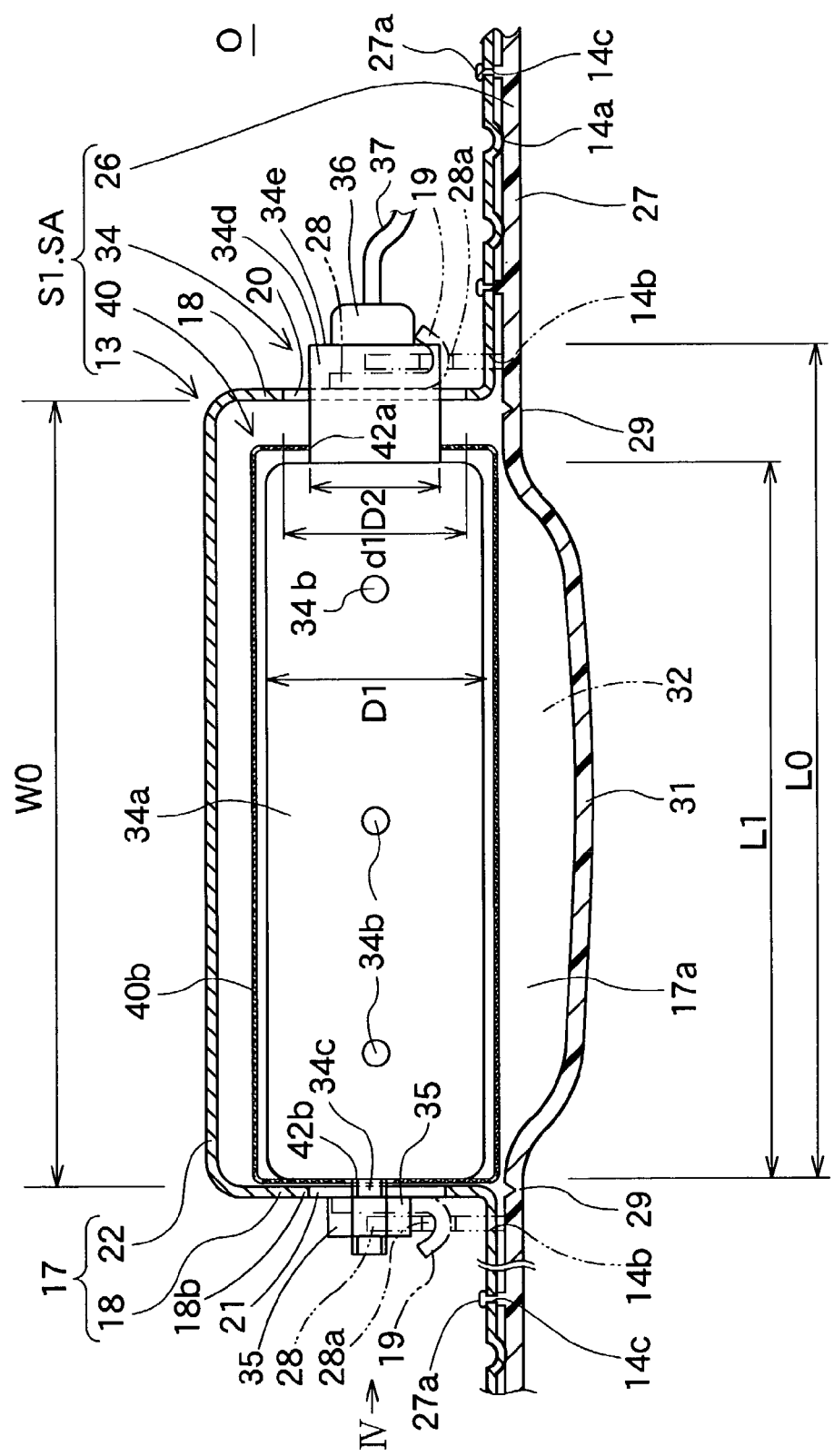
FIG. 3 is a sectional view of the portion cut along line III—III of FIG. 2.

As shown in FIGS. 1 to 3, the knee protecting airbag device S1 of the first embodiment is so arranged below a steering column 3 or on the front side of the vehicle of a driver MD (or a passenger M) to protect the knees K of the driver MD.

Here, the words "vertical", "transverse" and "longitudinal" will be specified to correspond to vertical, transverse and longitudinal directions respectively of a vehicle when the knee protecting airbag device is mounted on the vehicle.

The steering column 3 includes, as shown in FIG. 1, to a column body 4 connected to a steering wheel 1, and a column cover 7 arranged to cover the column body 4 below the steering wheel 1. The column body 4 is provided with a main shaft 5 and a column tube 6 covering the periphery of the main shaft 5. Between the main shaft 6 and the column tube 6, there are arranged the not-shown tilt mechanism capable of adjusting the angle of the ring face of the steering wheel 1, the not-shown telescopic mechanism capable of moving and stopping the steering wheel 1 in the axial direction of the main shaft 5, and so on.

The column cover 7 is formed of a synthetic resin into a generally square tube shape or the like. The column cover 7 is so arranged along the axial direction of the steering column 3 as to cover the steering column 3 below the steering wheel 1. And, the column cover 7 is arranged and protruded obliquely upward and rearward from an instrument panel (or a dash board) 9.

The knee protecting airbag device S1 is provided with a folded airbag 40, an inflator 34 for feeding an inflating gas to the airbag 40, an airbag cover 26 for covering the airbag 40 folded, and a case 13. The knee protecting airbag device S1 is arranged below the engine facing (or body) side of the column cover 7. In the airbag device S1 of the embodiment, moreover, the airbag 40, the inflator 34 and the airbag cover 26 are assembled with the case 13 to form an integral assembly or an airbag assembly SA. And, the airbag assembly SA is attached to the vehicle to mount the airbag device S1 on the vehicle.

The inflator 34 is formed into such a cylinder type as can discharge an inflating gas G when it receives an activation signal. The inflator 34 is provided with a column-shaped general portion 34a having gas discharge ports 34b, a screw male thread portion 34c protruding from one end face of the general portion 34a, and a connection portion 34d protruded from the other end face of the general portion 34. The screw male thread portion 34c is formed to have a smaller radius than that of the general portion 34a. The connection portion 34d is also formed to have a smaller radius than that of the general portion 34a.

The connection portion 34d is formed into a column shape. And, the connection portion 34d can be connected at its end face 34e to a connector 36 which has lead wires 37 connected. In the case of the embodiment, the inflator 34 is arranged, when mounted on the vehicle, to have its axial direction in the transverse direction of the vehicle. And, the connection portion 34d is protruded toward the outside O of the vehicle (i.e., to the right in the case of the embodiment) in the transverse direction.

The screw male thread portion 34c is given a smaller radius than that of the connection portion 34d, and a nut 35 is fastened on the screw male thread portion 34c to attach the inflator 34 to the case 13.

Here, this inflator 34 is fed with the activation signal through the lead wires 37 together with the not-shown airbag device mounted on the steering wheel 1, when an airbag activation circuit mounted on the vehicle detects a front collision of the vehicle.

Figure 5:
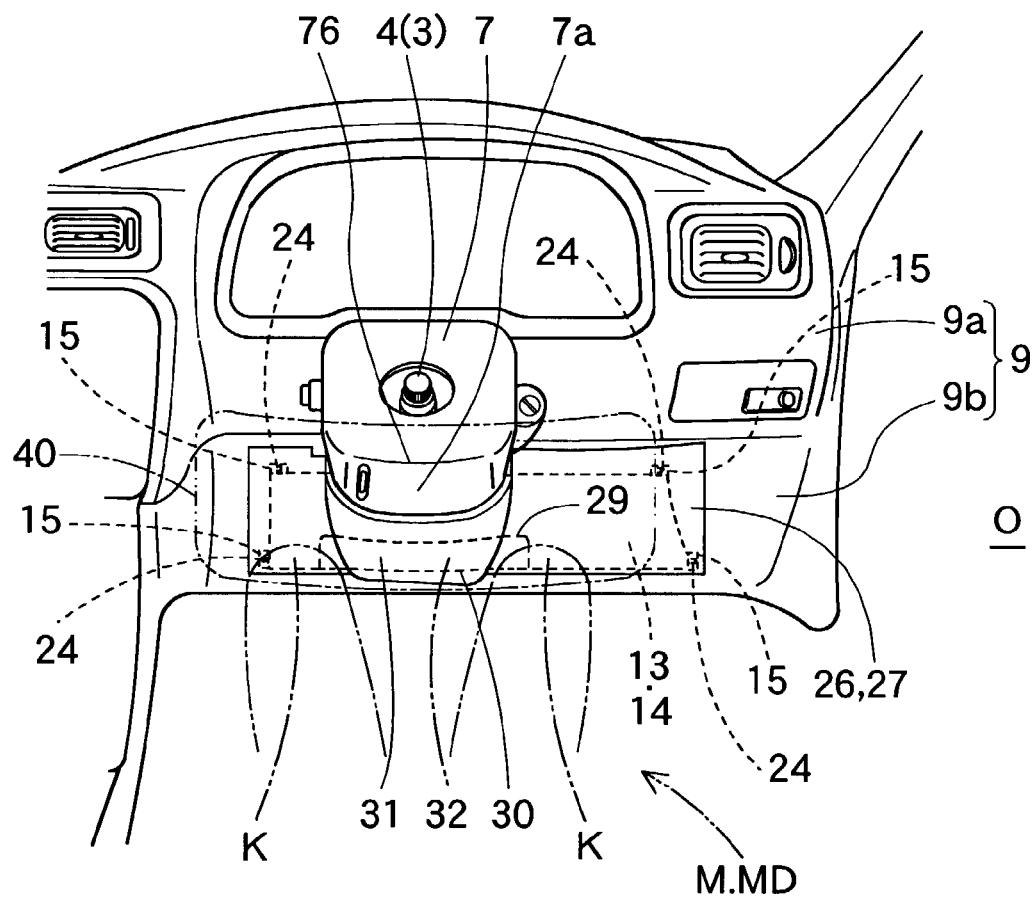
FIG. 5 is a schematic front view showing the used state of the knee protecting airbag device of the first embodiment and taken from the rear side of the vehicle.
Figure 6:
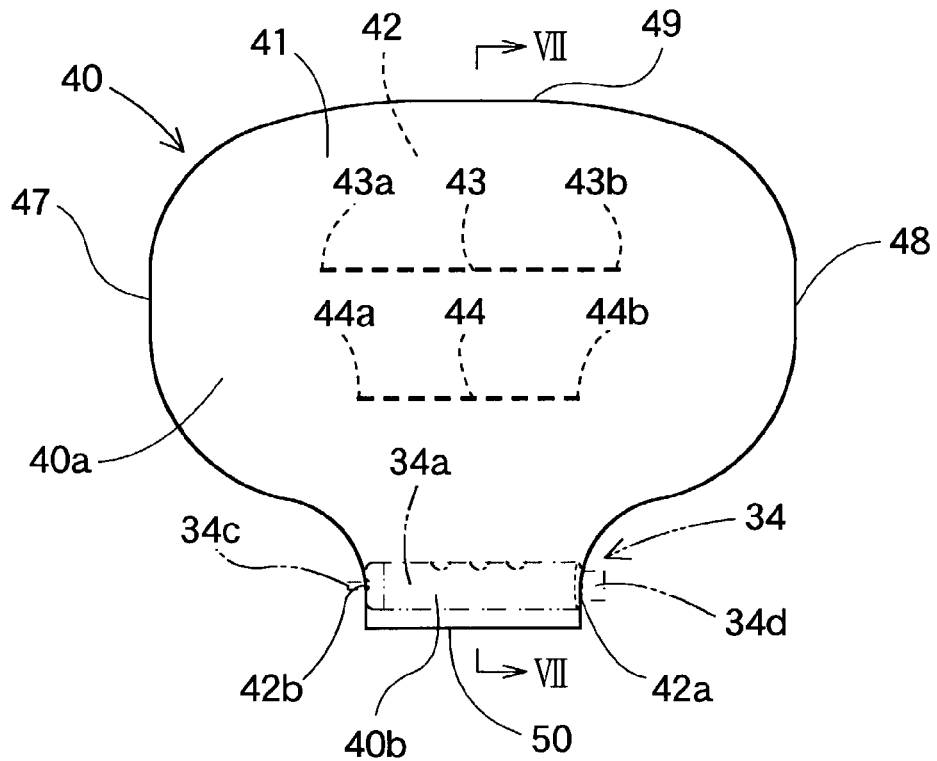
FIG. 6 is a front view of an airbag to be used in the first embodiment.
Figure 7:
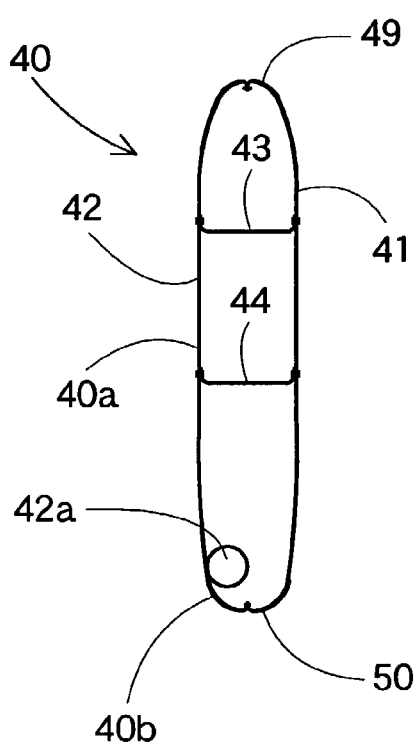
FIG. 7 is a schematic section of a portion cut along line VII—VII of FIG. 6.

The airbag 40 is formed of a woven fabric of flexible polyester or polyamide. As shown in FIGS. 5 to 7, the airbag 40 takes a generally rectangular sheet shape when it is completely expanded and inflated. And, the airbag 40 is provided with a housing portion 40b for housing the general portion 34a of the inflator 34 at the lower end 50, and a body portion 40a arranged on the upper side of the housing portion 40b. The body portion 40a is formed to have a larger transverse width size than that of the housing portion 40b. This housing portion 40b remains housed in the case 13 when the airbag 40 is completely expanded and inflated. On the other hand, the housing portion 40b is held in the case 13 by using the inflator 34. The airbag 40 is constructed of two woven fabrics: a passenger side wall portion 41 facing the driver MD and a body side wall portion 42 facing the column cover 7, and these wall portions 41 and 42 have a generally rectangular shape. And, the airbag 40 is formed by sewing the peripheral edges of the wall portions 41 and 42 to each other.

In the housing portion 40b on the lower side of the body side wall portion 42, there are formed two holes 42a and 42b. Of these, the insert hole 42a is opened in a circular shape to insert the connection portion 34d of the inflator 34. The insert hole 42b is given a smaller internal diameter than the external diameter of the general portion 34a of the inflator 34 so that only the screw male thread portion 34c is inserted thereinto. In the case of the embodiment, the insert hole 42a has an internal diameter size set substantially equal to the external diameter size D2 of the connection portion 34d. In short, the connection portion 34d of the inflator 34 protrudes from the insert hole 42a of the airbag 40. On the other hand, the screw male thread portion 34c of the inflator 34 protrudes from the insert hole 42b. And, the airbag 40 is attached to the case 13 by fitting the inner circumferences of the insert holes 42a and 42b on the connection portion 34d and the screw male thread portion 34c and by housing the inflator 34 in the case 13.

Here in the airbag 40, there are arranged in two vertical levels band-shaped tethers 43 and 44, which extend in the transverse directions. These tethers act as thickness regulating means for equalizing the thickness of the inflated airbag 40 generally all over its area so that the airbag 40 may go smoothly into the clearance between the knees K of the driver MD and the lower face 7a of the column cover 7. The individual tethers 43 and 44 are arranged to connect the passenger side wall portion 41 and the body side wall portion 42. These tethers 43 and 44 are arranged such that their two left and right ends 43a, 43b, 44a and 44b are separated from the left and right end portions 47 and 48 of the airbag 40.

In the airbag 40 of the embodiment, moreover, at the time of expansion and inflation, the body portion 40a folded and housed is protruded to the rear of the vehicle from the opening 17a of a housing body portion 17 of the case 13. And, the body portion 40a covers the area from the rear side face of the general portion 27 of the airbag cover 26 at the edge of the opening 17a to at least the vicinity of the upper end 7b of the column cover lower face 7a. At the same time, the body portion 40a can cover the front side of the left and right knees K of the driver MD.

The case 13 is made of a sheet metal. As shown in FIGS. 1 to 5, the case 13 is provided with a flat sheet portion 14, and the housing body portion 17 for housing the folded airbag 40 and the inflator 34.

The housing body portion 17 is formed into a bottomed box shape having the opening 17a directed to the rear of the vehicle. In the case of the embodiment, the housing body portion 17 is formed into a generally parallelepiped box shape having a generally rectangular bottom wall portion 22 and a surrounding wall portion 18 of a generally square tube shape. The surrounding wall portion 18 of the housing body portion 17 has wall portions 18a and 18b, which confront each other in the transverse direction of the vehicle. The wall portions 18a and 18b have holes 20 and 21 opened for mounting the inflator 34. The transverse width size W0 of the opening 17a, that is, the distance between the wall portions 18a and 18b, is made smaller than the total length L0 of both the general portion 34a and connection portion 34d of the inflator 34 and larger than the length L1 of the general portion 34a.

Figure 4:
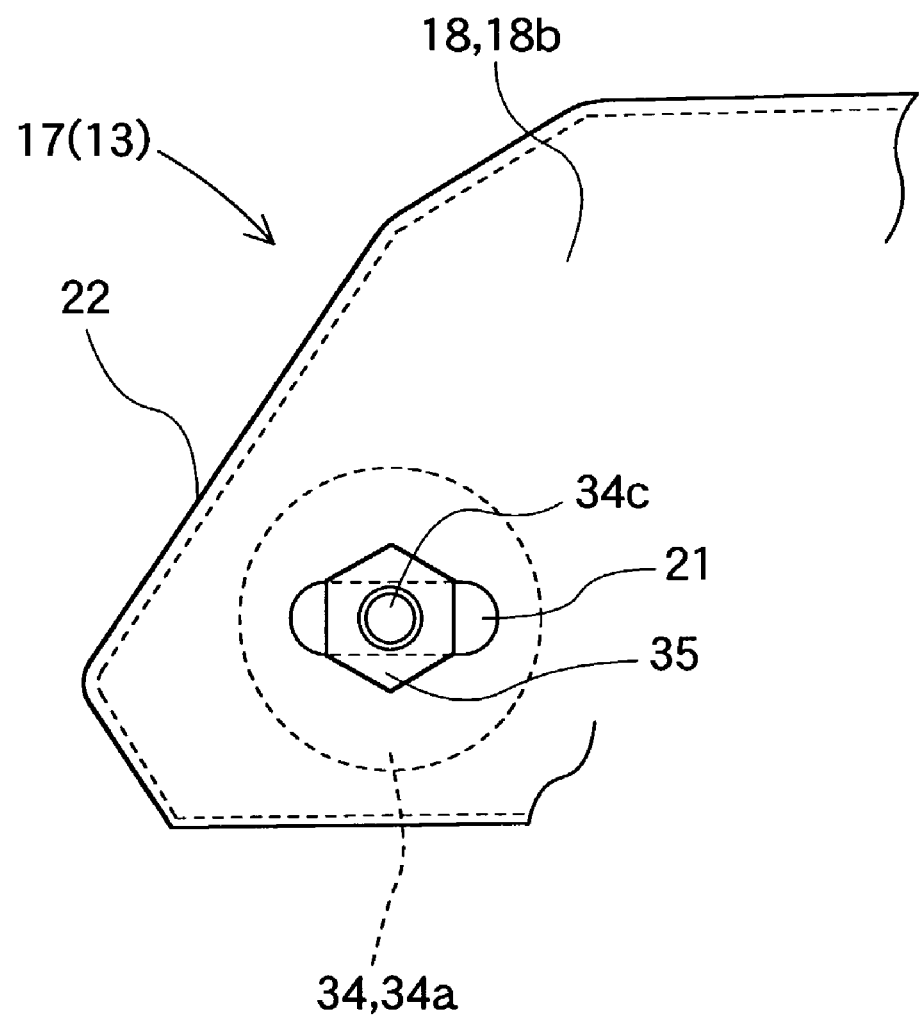
FIG. 4 is a side view of a case of the first embodiment and taken in a direction IV of FIG. 2.

The hole 20 is arranged in the wall portion 18a facing the vehicular outer side O in the transverse direction of the vehicle when the case 13 is mounted on the vehicle. Specifically, the hole 20 is used as the insert hole 20 for inserting the connection portion 34d of the inflator 34. On the other hand, the hole 21 arranged in the wall portion 18b is used as the mounting hole 21 having a width too small for the general portion 34a of the inflator 34 to enter, but does allow the screw male thread portion 34c of the inflator 34 to enter. Moreover, this mounting hole 21 is formed into a slot shape extending in the longitudinal direction of the vehicle, as shown in FIG. 4.

Figure 9A:
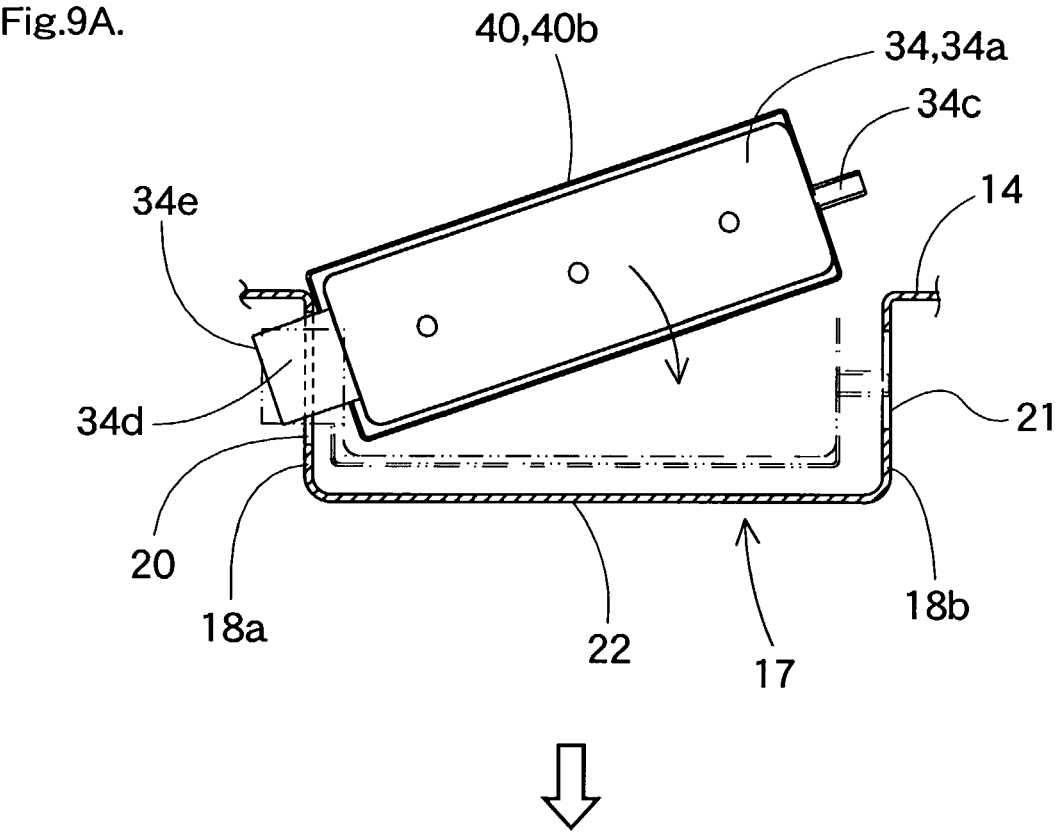
FIGS. 9A and 9B are diagrams for explaining the housed states of the airbag and an inflator in the case of the first embodiment.
Figure 9B:
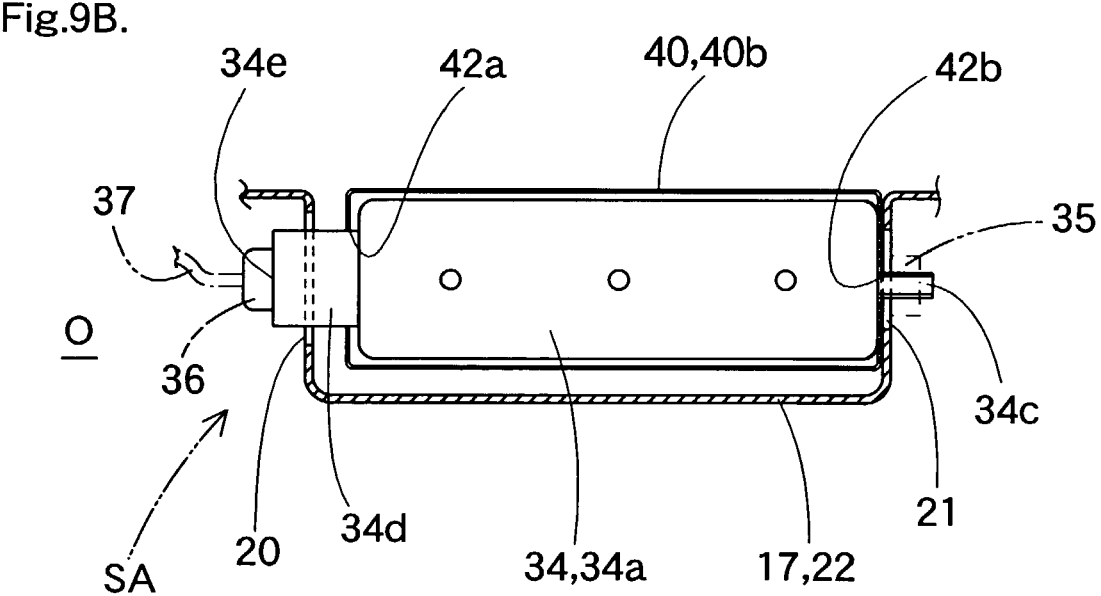

The inflator 34 is mounted in the housing body portion 17 in the following manner. At first, the connecting portion 34b is so inserted into the insert hole 20 while being sheathed with the housing portion 40b of the airbag 40, by being protruded from the inner side to the outer side of the housing body portion 17, as shown in FIG. 9A. After this, the screw male thread portion 34c is so inserted into the mounting hole 21 so as to protrude from the inner side to the outer side of the housing body portion 17, as shown in FIG. 9B. When the nut 35 is fastened on the screw male thread portion 34c protruded, moreover, the inflator 34 can be mounted in the housing body portion 17. At mounting time, the screw male thread portion 34c may be inserted first into the mounting hole 21, and the connection portion 34d may then be inserted into the insert hole 20. In the embodiment, the mounting hole 21 is formed into a slot shape elongated in the longitudinal direction of the vehicle, as shown in FIGS. 4, 9A and 9B. At the time of mounting those components, therefore, the connection portion 34d and the screw male thread portion 34c can be easily protruded from the housing body portion 17 by sliding the screw male thread portion 34c into the mounting hole 21. As a result, the inflator 34 can be easily housed in and held by the housing body portion 17. At the time of fastening the nut 35, on the other hand, at the periphery of the insert hole 42b in the airbag 40 is clamped to the peripheral wall 18b and the end face of the general portion 34a of the inflator 34 so that the periphery of the insert hole 42b is firmly attached to the case 13.

On the outer periphery of the surrounding wall portion 18, moreover, there are fixed a plurality of hooks 19 having a generally J-shaped section. Each hook 19 curves away from the bottom wall portion 22 so that its leading end is removed from the opening 17a. Four hooks 19 are arranged at the side of the later-described hinge portion 30 of the airbag cover 26 (at the lower face of the case surrounding wall portion 18). Moreover, three hooks 19 are arranged at the leading end 31a side of the later-described door portion 31 of the airbag cover 26 (at the upper face of the case surrounding wall portion 18). And, one hook 19 is arranged each at a portion of the two transverse sides of the vehicle of the case surrounding wall portion 18.

The sheet portion 14 is extended from the peripheral edge of the opening 17a of the housing body portion 17. And, the sheet portion 14 is formed into such a generally rectangular shape as can cover the front of the left and right knees K of the seated driver MD amply. At the individual four corners of the peripheral edge of the sheet portion 14, there are arranged mounting member portions 15 to be connected to the body side of the vehicle. Here, the upper edge side of the sheet portion 14 in the vicinity of the opening 17a has a concave depression so that the lower face 7a of the column cover 7 can protrude toward the rear of the vehicle. And, the sheet portion 14 is so curved of the upper edge side in the vicinity of the opening 17a that it may be protruded to the rear of the vehicle, matching the curved state of the lower face 7a. From the peripheral edge of the opening 17a to the outer peripheral edge of the sheet portion 14, there are formed ribs 14a for enhancing the rigidity of the sheet portion 14. These ribs 14a are constructed to support the later-described general portion 27 of the airbag cover 26 on their rear side faces.

In the peripheral edge of the housing body portion opening 17a of the sheet portion 14, moreover, there are formed a plurality of through holes 14b which are opened generally in a rectangular shape. These through holes 14b are arranged so that the mounting portions 28 of the airbag cover 26 can pass through, which are retained on the individual hooks 19.

On the left and right sides of the sheet portion 14 removed from the housing body portion 17, on the other hand, there are formed a plurality of through mounting holes 14c. At these mounting holes 14c the airbag cover 26 is attached to the case 13 by a thermal caulking method. Specifically, the airbag cover 26 is attached to the case 13 by using the later-described mounting leg portions 27a of the airbag cover 26 and the hooks 19 together. Specifically, the individual mounting leg portions 27a are inserted into the individual mounting holes 14c. And, the leading ends of the individual mounting leg portions 27a are radially enlarged while being melted, so that the solidified leading ends may not be removed through the mounting holes 14c.

In the individual mounting member portions 15 of the case 13, there are formed the connecting holes (not shown) which are fixed on the body side of the vehicle by means of bolts 24 (FIG. 5). Here, the individual mounting member portions 15 are mounted by the bolts 24 on the predetermined brackets which are fixed on a dash board reinforcement, a center brace, and a front body pillar on the body side. These brackets are built so that they can be plastically deformed to absorb an impact force.

Here, the embodiment embodies the case where the sheet portion 14 and the housing body portion 17 of the case 13 are pressed into an integral construction. It is natural that the case 13 may also be formed by welding a sheet metal suitably.

The airbag cover 26 is made of a thermoplastic elastomer such as polyolefins. The airbag cover 26 is given such a larger external size than that of the case 13, as shown in FIGS. 1 to 3, as to cover the vehicular rear side of the case 13.

In the case of the embodiment, the dash board 9 is provided with an upper panel 9a and a lower panel 9b. The airbag cover 26 is arranged on the side of the lower panel 9b at the peripheral edge of the column cover 7. And, the airbag cover 26 covers the lower periphery of the column cover 7 protruded from the dash board 9. As viewed from the rear of the vehicle, therefore, the airbag cover 26 is recessed downward at the central portion of its upper edge to allow the column cover 7 to protrude rearward. And, the upper edge at the recess of the airbag cover 26 is curved toward the rear of the vehicle in a manner matching the curve of the column cover lower face 7a.

The airbag cover 26 is provided with the door portion 31 for covering the opening 17a of the housing body portion 17, and the general portion 27 for covering the vehicular rear side of the sheet portion 14.

The door portion 31 is formed into a generally rectangular sheet shape slightly larger than the opening 17a. At the inverted U-shape portion of the outer peripheral edge of the door portion 31, there is formed a thinned breakaway portion 29 connected to the general portion 27 so that the door portion 31 may be opened downward. The breakaway portion 29 is so formed by forming continuous or discontinuous grooves in the vehicular front side face of the door portion so that it may be easily broken when the door portion 31 is pushed by the airbag 40 being inflated.

On the lower edge side of the door portion 31, on the other hand, there is formed the hinge portion 30 which provides the turning center of the door portion 31 when the breakaway portion 29 is broken to open the door portion 31. This hinge portion 30 is formed integrally, having a smaller thickness than that of the general portion 27 or the door portion 31 within the range that it does not break.

From the general portion 27 near the periphery of the body opening 17a, there are protruded toward the front of the vehicle a plurality of mounting members 28. These mounting members 28 are passed through the individual through holes 14b of the sheet portion 14 of the case 13. These individual mounting members 28 are formed into a generally rectangular sheet shape. In each of these mounting members 28, there is formed a retaining hole 28a which is opened in a rectangular shape so that the mounting member 28 is retained at the periphery of the hole 28a by the hook 19.

At the predetermined positions of the general portion 27, on the other hand, there are formed a plurality of mounting leg portions 27a. These mounting leg portions 27a are thermally caulked and retained on the peripheral edges of the individual mounting holes 14c in the sheet portion 14 of the case 13. The individual mounting leg portions 27a are formed before being thermally caulked into such around rod shape as to extend through the mounting holes 14c. After being thermally caulked, the individual mounting leg portions 27a are pressed flat at their leading ends, as shown in FIG. 3.

Figure 8A:
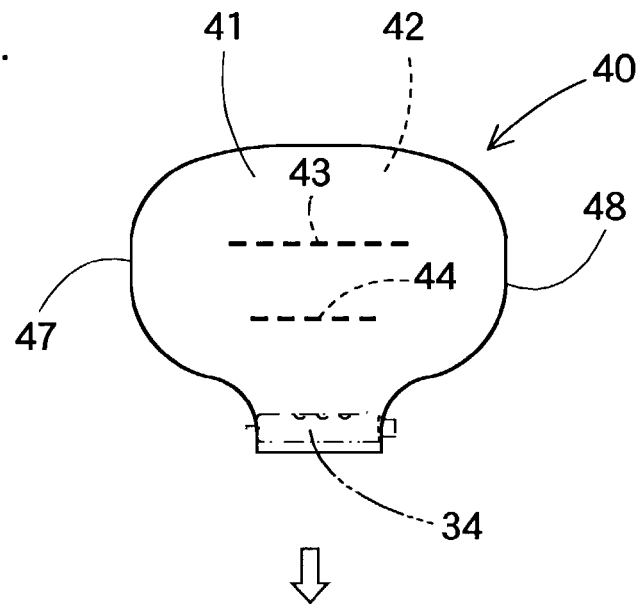
FIGS. 8A to 8C are schematic diagrams for explaining steps of folding the airbag of the first embodiment.
Figure 8B:
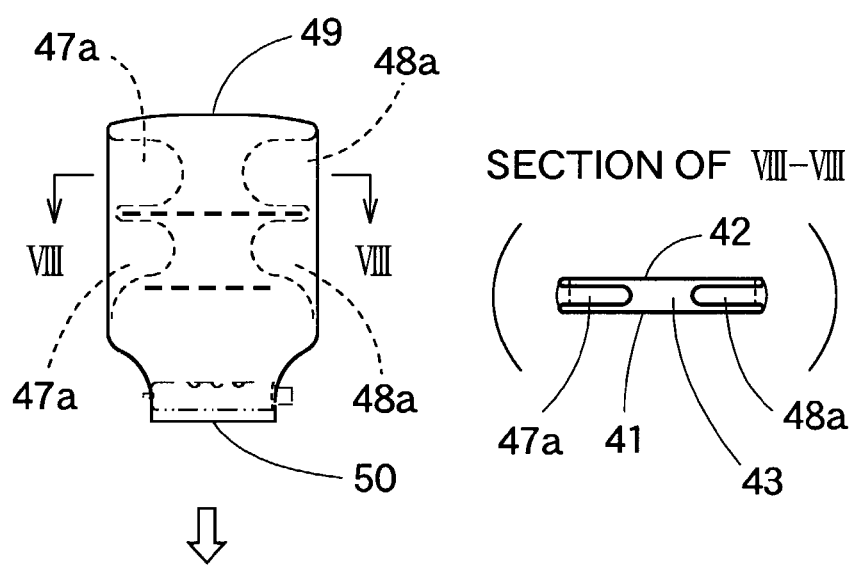

Here will be described how to assemble this airbag device S1. First of all, the airbag 40 is folded in the following manner. As shown in FIG. 8A, the airbag 40 is expanded flat such that the passenger side wall portion 41 and the body side wall portion 42 overlap. From this state, the two left and right edges 47 and 48 of the airbag are folded into the inside of the airbag 40 as to reduce the width size in the transverse direction, as shown in FIG. 8B. At this time, the end portions 43a, 43b, 44a and 44b of the individual tethers 43 and 44 block the edges 47 and 48. However, portions 47a and 48a not blocked by the end portions 43a, 43b, 44a and 44b of the tethers 43 and 44 are inserted into the airbag 40 close to the transverse center of the airbag 40. Then, the transverse width size of the airbag 40 after the edges 47 and 48 are inserted is made so compact as to correspond to the transverse width size W0 of the housing case 13.

Figure 8C:
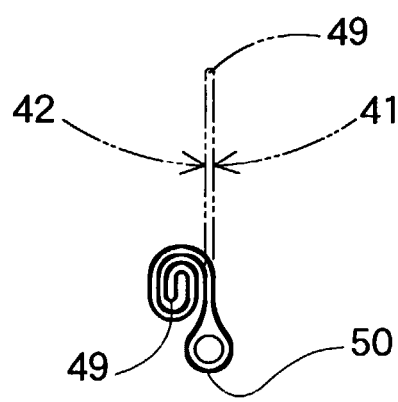

Then, the airbag 40 is folded to bring its upper end 49 closer to the side of the lower end 50, as shown in FIGS. 8B and 8C. In the case of the embodiment, the upper end 49 is rolled on the side of the body side wall portion 42. This completes the folding of the airbag 40.

Here in the case of the embodiment, the airbag 40 is folded while housing the inflator 34 therein. At this time, the connection portion 34d is protruded from the insert hole 42a. And, the screw male thread portion 34c is protruded from the insert hole 42b. Here, the inflator 34 cannot be inserted into the airbag 40 directly from the insert hole 42a or 42b. At the peripheral edges of the passenger side wall portion 41 and the body side wall portion 42, therefore, there are left unsewn portions, from which the inflator 34 is housed, and after the inflator 34 is housed, the unsewn portions are sewn.

And, the airbag 40 is wrapped, after folding, with the not-shown wrapping film which can be broken to prevent the airbag 40 from collapsing. Here, the connection portion 34d and the screw male thread portion 34c of the inflator 34, protruded from the mounting holes 42a and 42b, are also protruded from the wrapping film.

After this, the connection portion 34d of the inflator 34 is inserted into the insert hole 20, protruded from the inner side to the outer side of the housing body portion 17, as shown in FIG. 9A. At the same time, the screw male thread portion 34c is inserted into the mounting hole 21 and protruded from the inner side to the outer side of the housing body portion 17, as shown in FIG. 9B. By fastening the nut 35 on the screw male thread portion 34c, the inflator 34 and the airbag 40 can be housed and held in the housing body portion 17.

And, the airbag cover 26 is attached to the case 13. For this attachment, the individual mounting members 28 are inserted from the rear side of the vehicle of the case 13 into the corresponding through holes 14b. Simultaneously with this, the individual rod-shaped mounting leg portions 27a are inserted into the corresponding mounting holes 14c. At this time, the individual mounting members 28 are elastically deformed to separate from the housing body portion 17, through interfering with the hooks 19. After this, the mounting members 28 are restored so that the hooks 19 are inserted into the retaining holes 28a. As a result, the peripheries of retaining holes 28 are retained by the hooks 19.

Next, the leading ends of the mounting leg portions 27a, protruded from the individual mounting holes 14c, are thermally caulked to retain the individual mounting leg portions 27a on the peripheral edges of the mounting holes 14c on vehicular front side face of the sheet portion 14. As a result, the airbag cover 26 can be attached to the case 13 thereby to form the airbag assembly SA.

With this airbag assembly SA, the knee protecting airbag device Si can be mounted on the vehicle when the individual mounting member portions 15 of the sheet portion 14 are connected to the predetermined brackets on the body side by means of the bolts 24.

After the airbag device S1 is mounted on the vehicle, the connector 36 connected with the lead wires 37 extending from the predetermined airbag activation circuit is connected with the end face 34e of the connection portion 34d of the inflator 34.

Then, the upper panel 9a and the lower panel 9b of the dash board 9, and an under cover 11 (as shown in FIGS. 1 and 2) can be mounted on the vehicle.

Figure 10:
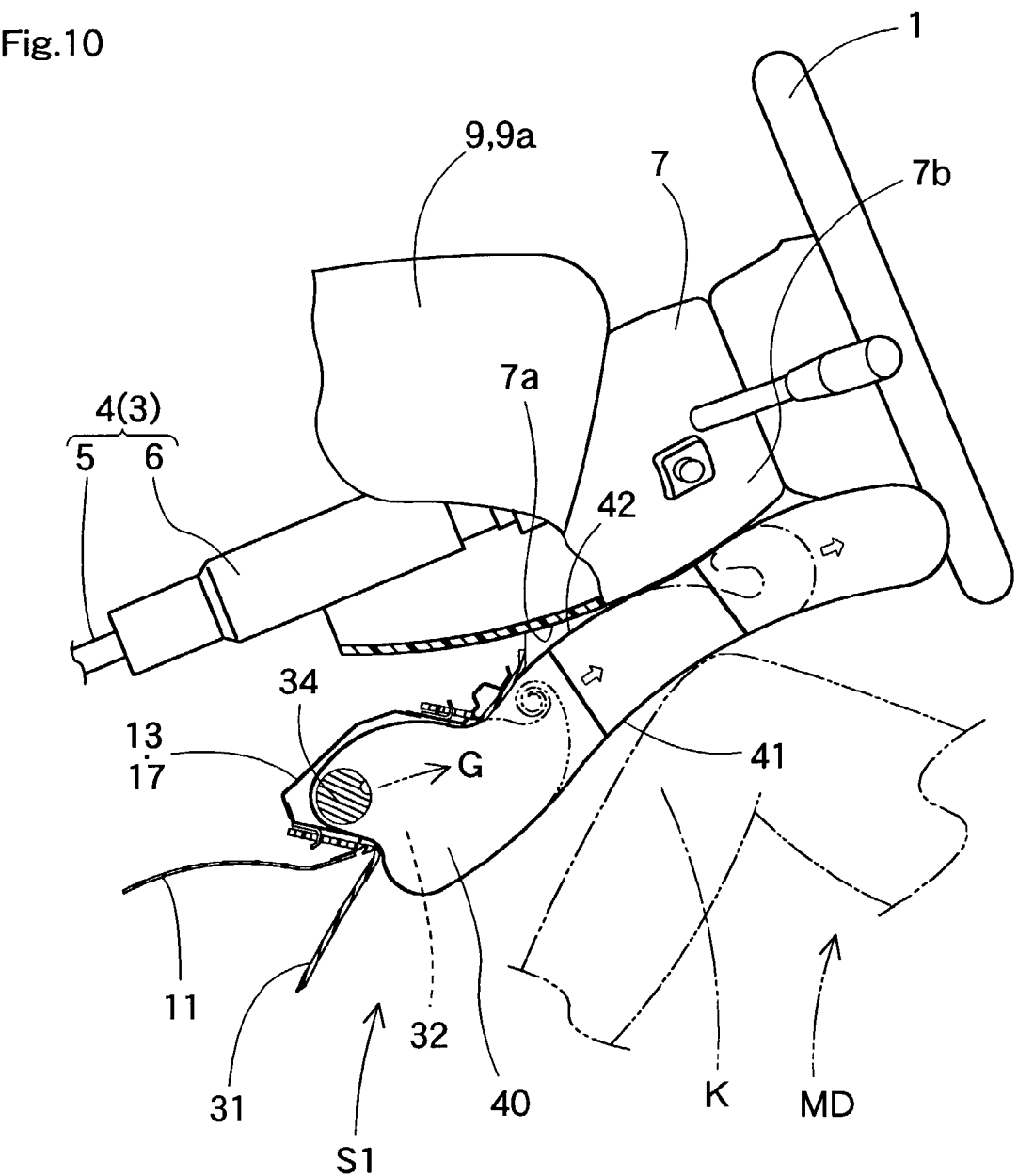
FIG. 10 is a schematic longitudinal section showing the state in which the airbag of the first embodiment has completed its expansion and inflation, taken in the vehicular longitudinal direction.

The inflating gas G is discharged from the gas discharge ports 34b, as shown in FIG. 10, if the activation signal is inputted to the general portion 34a of the inflator 34 through the lead wires 37 after the airbag device S1 was mounted on the vehicle. And, the airbag 40 is inflated by admitting the inflating gas G, to break the not-shown wrapping film. And, the airbag 40 pushes the door portion 31 of the airbag cover 26 to break the breakaway portion 29 and to open the door portion 31 downward at the hinge portion 30. As a result, the airbag 40 is protruded to the rear of the vehicle from the opening 17a of the housing body portion 17 through the opening 32 of the airbag cover 26, as formed when the door portion 31 is opened. And, the airbag 40 is greatly expanded and inflated upward along the column cover lower face 7a.

And, the knee protecting airbag device S1 of the first embodiment is constructed such that the inflator 34 exposes its connection portion 34d to the outside of the case 13 through the insert holes 42a and 20 formed in the airbag 40 and the case 13, even while the folded airbag 40 and the inflator 34 are held in the housing body portion 17 of the case 13. Therefore, the connector 36 for inputting the activation signal can be easily connected with the exposed connection portion 34d of the inflator 34.

Moreover, the internal diameter size d1 of the insert hole 20 of the case 13 is set smaller than the external diameter D1 of the general portion 34a in the vicinity of the connection portion 34d in the inflator 34. Even if the inflator 34 at the action time shifts, therefore, the inflator 34 is prevented from going out through the insert hole 20 of the case 13.

Moreover, the air in the housing body portion 17 of the case 13 at the initial stage of the action of the inflator 34 can be released from the insert hole 20 of the case 13. This makes it possible to prevent the housing body portion 17 from being deformed by the air in the housing body portion 17 at the initial stage of the inflation of the airbag 40.

In the knee protecting airbag device S1 of the first embodiment, therefore, the connector 36 connected with the lead wires 37 for inputting the activation signal can be connected with the end face 34e of the connection portion 34d of the inflator 34 easily, even after the airbag 40 and the inflator 34 are housed in the housing body portion 17 of the case 13. On the other hand, the inflator 34 can be prevented from popping unnecessarily out from the insert hole 20 of the case 13. It is also possible to prevent the housing body portion 17 of the case 13 from being deformed at the initial stage of the inflation of the airbag 40.

In the case of the first embodiment, moreover, the connection portion 34d of the inflator 34 is protruded to the outside of the case 13 through the insert hole 20 of the case 13. In short, it is easy to observe the end face 34e of the connection portion 34d visually. Therefore, it is easier to connect the connector 36 connected with the lead wires 37 for inputting the activation signal. In this construction, on the other hand, the general portion 34a of the inflator 34 in the vicinity of the connection portion 34d is given a larger external diameter size D1 than the internal diameter size d1 of the insert hole 20 of the case 13. In short, the connection portion 34d itself is inserted into the insert hole 20 of the case 13. Even if the inflator 34 when in action deviates perpendicularly of the axis of the insert hole 20 of the case 13, therefore, the inner circumference 20a of the case insert hole 20 holds the outer circumference of the connection portion 34d. As a result, the held position of the inflator 34 in the case 13 can be stabilized to stabilize the feed direction of the inflating gas G into the airbag 40.

In the first embodiment, moreover, the inflator 34 is formed into a general column shape, in which it is axially arranged in the transverse direction of the vehicle. And, the connection portion 34d of the inflator 34 is arranged on the axial end side of the inflator 34 and on the vehicle outer side O in the transverse direction of the vehicle. When the airbag assembly SA having the airbag 40, the inflator 34 and the case 13 integrated is to be mounted on the vehicle, therefore, the connector 36 connected with the lead wires 37 can be connected with the connection portion 34d of the inflator 34 from the vehicular outer side O, at which space is comparatively large. This makes it easy to connect the lead wires 37 after the airbag assembly SA is mounted on the vehicle.

Figure 11:
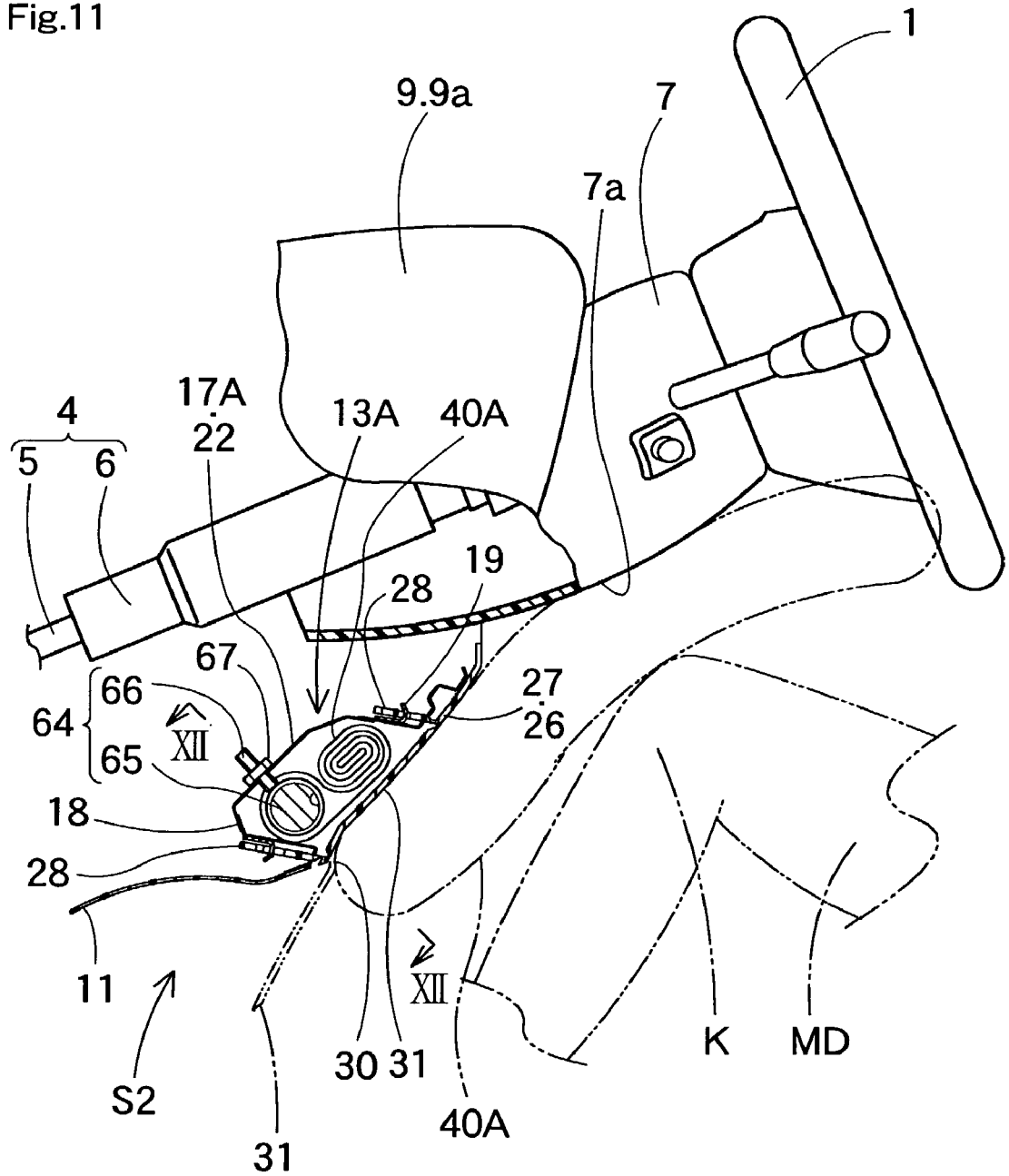
FIG. 11 is a schematic longitudinal section taken in the longitudinal direction of a vehicle and showing the used state of a knee protecting airbag device according to a second embodiment of the invention.
Figure 12:
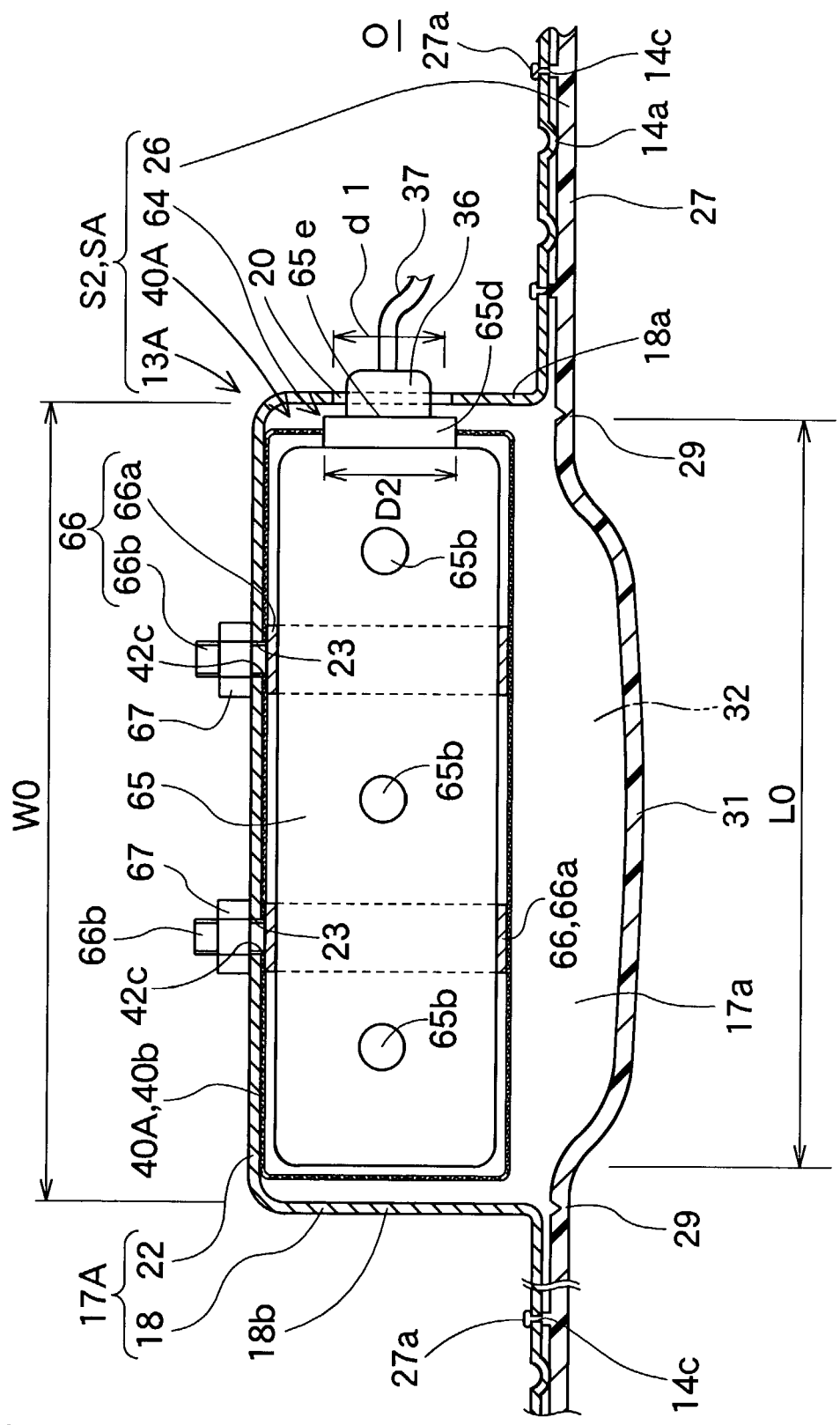
FIG. 12 is a schematic section of a portion cut along line XII—XII of FIG. 11.

Here, the first embodiment is constructed such that the end face 34e of the connection portion 34d of the inflator 34 to be connected with the connector 36 is protruded from the housing body portion 17 of the case 13. The inflator should not be limited to the aforementioned construction but may be constructed into an inflator of a knee protecting airbag device S2 of a second embodiment shown in FIGS. 11 and 12. In an inflator 64 of this airbag device S2, the end face 64e of a connection portion 64d to be connected with the connector 36 slightly enters the housing body portion 17A while being exposed to the outside through the insert hole 20 of a housing body portion 17A of a case 13A.

The inflator 64 of the second embodiment is provided with a generally column-shaped body portion 65 having gas discharge ports 65b, and a plurality of (or two in the embodiment) bracket portions 66 fixed on the outer circumference of the body portion 65. The body portion 65 is provided with a column-shaped general portion 65a having the gas discharge ports 65b therein, and a column-shaped connection portion 65d protruded from the end face of the general portion 65a. The connection portion 65d has a smaller diameter than that of the general portion 65a. The end face 65e of the connection portion 65d can connect with the connector for the lead wires 37 connected to the input source of the activation signal.

Each bracket portion 66 includes an annular holding portion 66a and a bolt 66b protruded from the holding portion 66a. The holding portions 66a can clamp the general portion 65a of the body portion 65.

In the case 13A, the housing body portion 17A is not provided with the mounting hole 21 of the first embodiment. However, the case 13A is provided with the insert hole 20 for inserting the connector 36, and insert holes 23 for inserting the individual bolts 66b. In these points, the case 13A is different from the case 13 of the first embodiment. The remaining construction of the case 13A is similar to that of the case 13 of the first embodiment. Therefore, the similar portions will be omitted from this description, designating them by the same reference numerals.

The insert hole 20 of the case 13A has such a smaller internal diameter size d1 than the external diameter size D2 of the connection portion 65*d* as to insert the connector 36 thereinto. On the other hand, the insert holes 23 are formed in the bottom wall portion 22 of the housing body portion 17A so as to correspond to the bolts 66*b* of the individual bracket portions 66. Moreover, the transverse width size W0 of the opening 17*a* of the housing body portion 17A is set smaller than the axial length LO of the inflator 64.

In an airbag 40A of the second embodiment, the housing portion 40*b* to be housed in the housing body portion 17A of the case 13 upon completion of the expansion and inflation is provided with the insert hole 42*a* in which the end face 65*e* of the connection portion 65*d* of the inflator 64 can be inserted. However, the airbag 40A is not provided with the insert hole 42*b* unlike the airbag 40 of the first embodiment. Moreover, the airbag 40A is provided with insert holes 42*c* for inserting the bolts 66*b* of the individual bracket portions 66. In these points, the airbag 40A is different from the airbag 40 of the first embodiment. The remaining construction of the airbag 40A is similar to that of the airbag 40 of the first embodiment. Therefore, similar portions will be omitted from description, designating them by the same reference numerals.

In the airbag device S2, the airbag 40A is such folded with the individual bolts 66*b* being protruded from the insert holes 42*c* that the inflator 64 is housed in the housing portion 40*b*. And, the holding steps themselves of the airbag 40A are similar to those of the first embodiment.

When the airbag assembly SA is to be assembled, the folded airbag 40A is housed together with the inflator 64 in the housing body portion 17A of the case 13A. At this time, the individual bolts 66*b* protruded from the housing portion 40*b* are individually protruded from the insert holes 23 of the housing body portion 17A. When nuts 67 are fastened on the individual bolts 66*b*, the inflator 64 and the airbag 40A are housed and held in the housing body portion 17A.

When the airbag cover 26 is then attached to the case 13A as in the first embodiment, the airbag assembly SA can be formed. And, the operation to mount the airbag assembly SA on the vehicle and other operations are similar to those of the first embodiment.

In this knee protecting airbag device S2 of the second embodiment, the end face 65*e* of the connection portion 65*d* to be connected with the connector 36 is so exposed to the outside, although it is inside the housing body portion 17A, and can be visually observed through the insert hole 20 of the housing body portion 17A of the case 13A. Even after the airbag 40A and the inflator 64 are housed in the housing body portion 17A, therefore, the lead wires 37 for inputting the activation signal can be easily connected with the connection portion 65*d* of the inflator 64.

Moreover, the external diameter size D2 of the connection portion 65*d* is larger than the internal diameter size d1 of the insert hole 20 so that the inflator 64 can be prevented from unnecessarily popping out of the case insert hole 20.

Moreover, the housing portion 17A has the insert hole 20 which can release the air to the outside. This makes it possible to prevent the housing portion 17A from being deformed by the air in the housing portion 17A at the initial stage of the inflation of the airbag 40A.

In this second embodiment, still moreover, when the airbag assembly SA having the airbag 40A, the inflator 64 and the case 13A integrated is to be mounted on the vehicle, the connector 36 having the lead wires 37 connected therewith can be connected with the connection portion 65*d* of the inflator 64 not from the central side of the vehicle but from the vehicular outer side O having comparatively large space. This makes it easy to connect the lead wires 37 after the airbag assembly SA was mounted on the vehicle.

Figure 13:
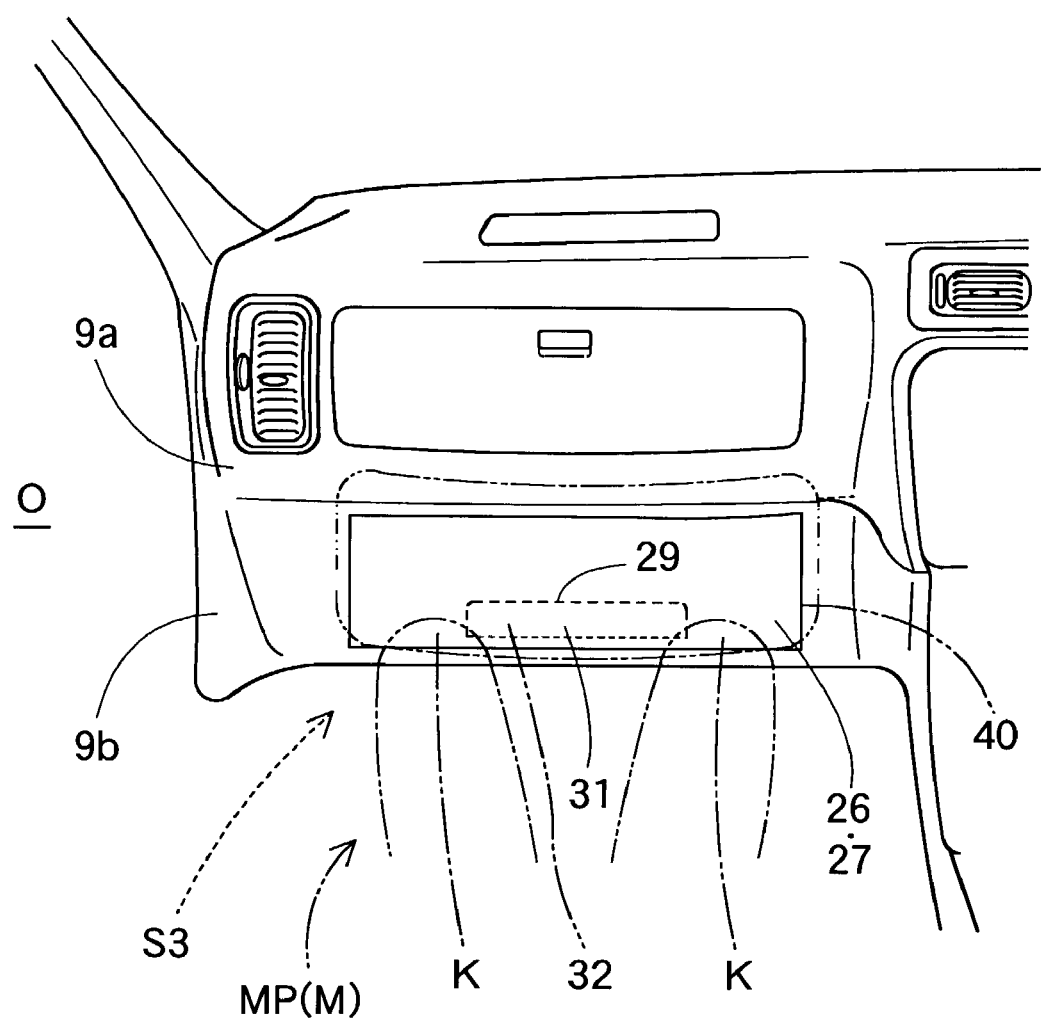
FIG. 13 is a schematic front view of the rear side of the vehicle and showing the state in which a knee protecting airbag device according to a third embodiment is arranged on the side of a passenger's seat facing the front of the vehicle.
Figure 14:
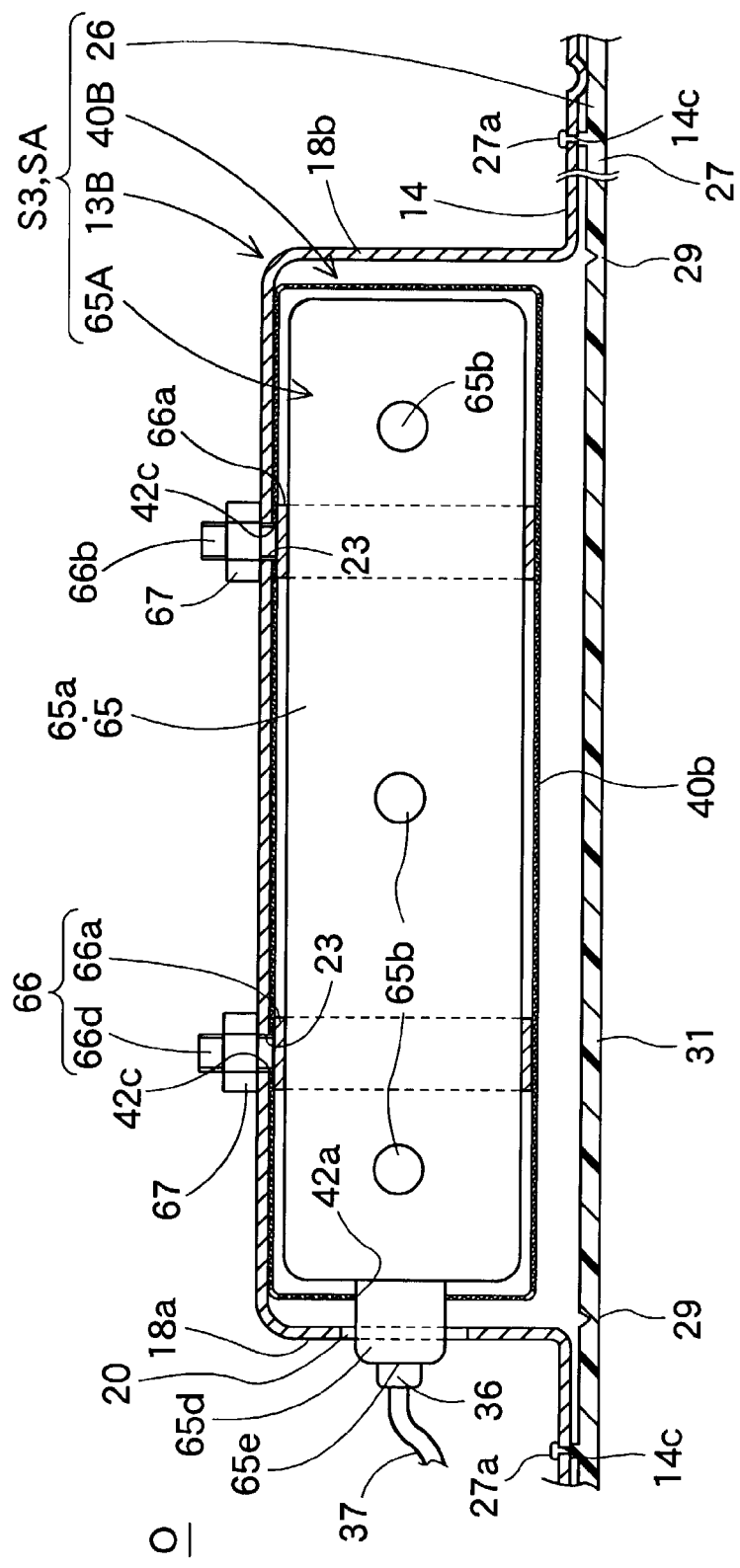
FIG. 14 is a schematic transverse section of the third embodiment.

On the other hand, the first and second embodiments have been described by exemplifying the airbag devices S1 and S2, which are arranged on the vehicular body side of the vehicular front side of the driver MD so as to protect the knees K of the driver MD. As shown in FIGS. 13 and 14, an airbag device S3 may also be arranged on the vehicular body side (the dash board 9 side), as located on the front side of the vehicle of a passenger MP seated on the passenger's seat, so as to protect the two knees K of the seated passenger MP. Here, an airbag 40B to be used in the airbag device S3 is formed to have a larger transverse width size than that of the airbag 40A of the airbag device S2. In the airbag device S3, moreover, the sheet portion 14 of a case 13B and the airbag cover 26 are made flat to correspond to the portion of the dash board 9 in front of the passenger's seat.

Moreover, a housing body portion 17B of the case 13B, an inflator 64A and the airbag 40B are made transversely symmetric as in the second embodiment. Moreover, the end face 65*e* of the connection portion 65*d* in the inflator 64A is arranged and protruded to the vehicular outer side O from the insert hole 20 of the case 13B. Thus the connection portion 65*d* of the end side of the inflator 64A of the airbag device S3 is also arranged in the vehicular transverse direction on the vehicular outer side O thereby to facilitate the works to connect the lead wires 37 after the airbag device S3 was mounted on the vehicle.

Excepting the aforementioned points, the third embodiment is constructed like the second embodiment and can attain actions and effects similar to those of the first embodiment.

Here will be described knee protecting airbag devices S4 and S5 capable of achieving the second object of the invention.

The knee protecting airbag device S4 of the fourth embodiment is arranged, as shown in FIGS. 15 to 19, below the steering column 3 on the front side of the vehicle of the driver MD so that it may be able to protect the knees K of the driver MD as the passenger.

Here, the vehicle for mounting the knee protecting airbag device S4 of the fourth embodiment has a construction similar to that of the vehicle for mounting the aforementioned airbag device S1 of the first embodiment, except for a dash board 110. Therefore, similar portions will be omitted from description here, designating them by the same reference numerals. The dash board 110 is provided with an upper panel 110*a* and a lower panel 110*b*.

The knee protecting airbag device S4 is provided with a folded airbag 144, an inflator 136 for feeding an inflating gas to the airbag 144, a case 112 for housing the folded airbag 144 and the inflator 136, and an airbag cover 122 for covering the vehicular rear of the case 112. This case 112 is opened at the rear side of the vehicle.

Figure 15:
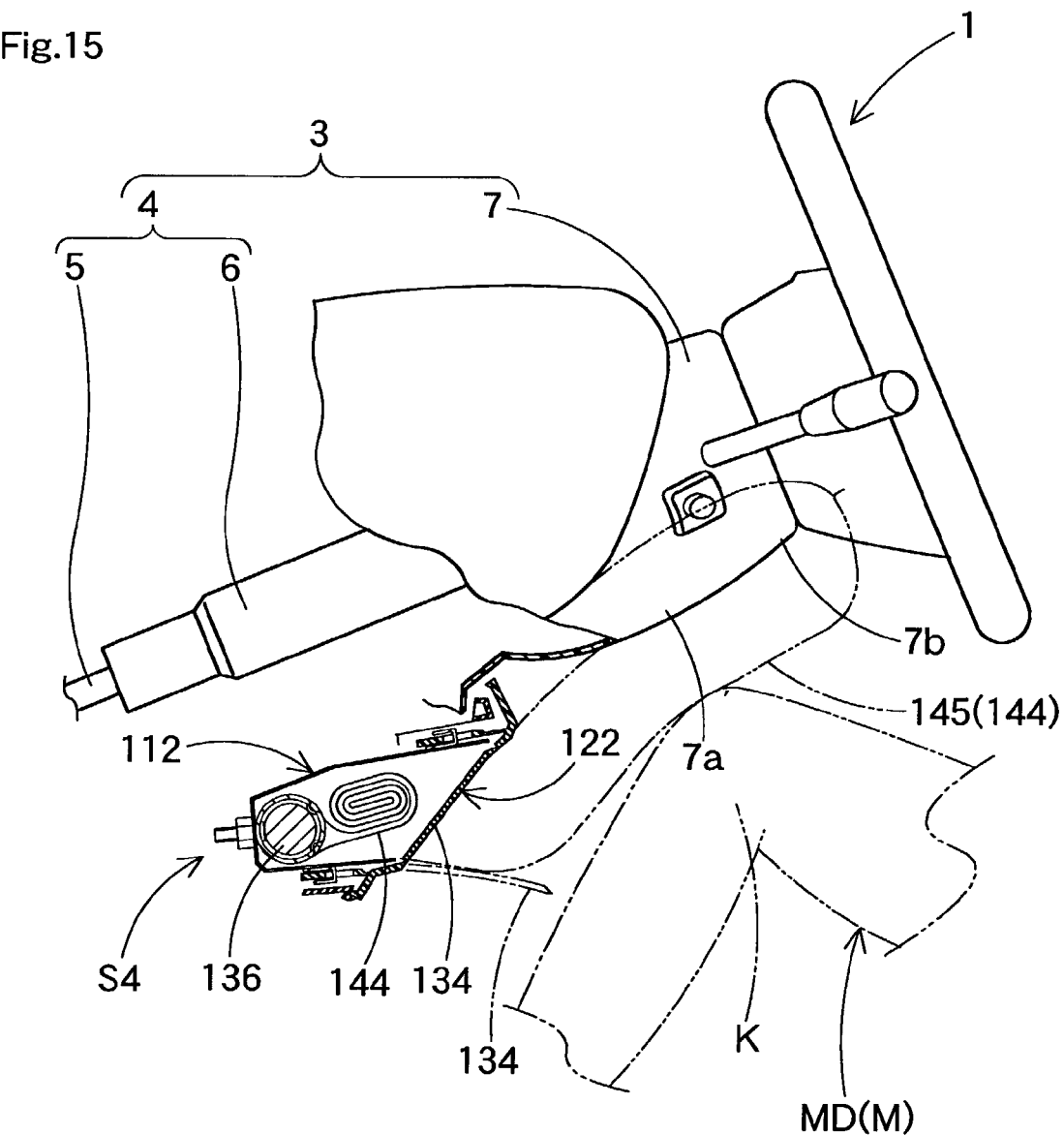
FIG. 15 is a schematic section taken in the longitudinal direction of a vehicle and showing the used state of a knee protecting airbag device according to a fourth embodiment of the invention.
Figure 16:
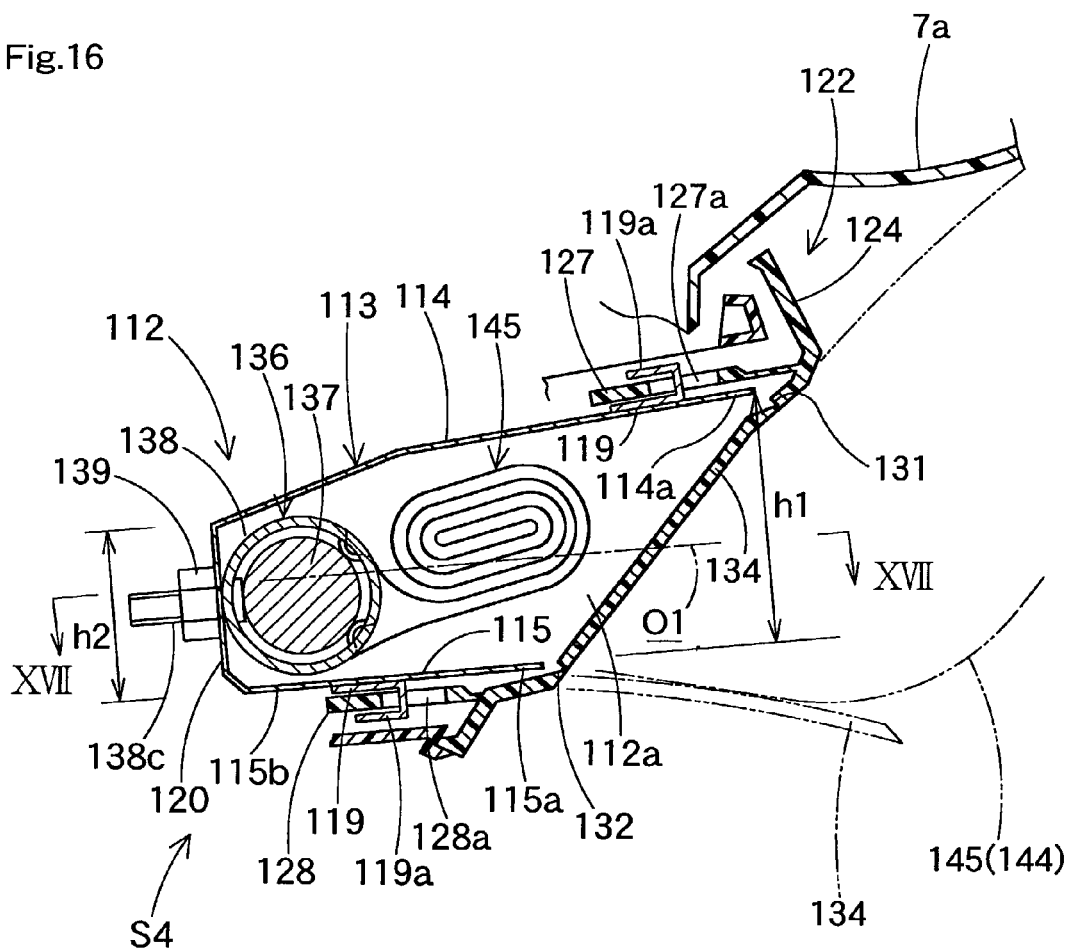
FIG. 16 is an enlarged schematic longitudinal section of the knee protecting airbag device of the fourth embodiment in the vehicular longitudinal direction.

The case 112 is made of a sheet metal and is arranged on the lower side of the steering column 3, as shown in FIGS. 15 to 18. The case 112 is provided with a surrounding wall portion 113 of a generally square tube shape and a bottom wall portion 117 closing the vehicular front side of the surrounding wall portion 113. Moreover, the axial direction O1 of case 112 is slightly inclined upward from the horizontal so that its rear side of the vehicle may be raised, as shown in FIG. 16. Moreover, the case 112 has greater vertical length h1 in the vicinity of its opening 112*a* than the vertical length h2 of the bottom wall portion 117. In short, the case 112 expands toward its opening 112*a*. The surrounding wall portion 113 is provided with an upper wall portion 114 and a lower wall portion 115 opposed to each other in the vertical direction. In the embodiment, moreover, the upper wall portion 114 is arranged with such an upward inclination toward the rear side of the vehicle that the vicinity of an opening side end portion 114a may be positioned above the end portion on the side of the bottom wall portion 117. The lower wall portion 115 is formed into a flat sheet shape and is so arranged along the axial direction O1 of the case 112 that its opening side end portion 115a may take a higher position than that of its bottom wall side end portion 115b. Moreover, the vicinity of the opening side end portion 114a of the upper wall portion 114 is arranged with a larger upward inclination than that of the lower wall portion 115 in the vicinity of the opening side end portion 115a.

In the embodiment, on the other hand, the vertical height h1 in the vicinity of the opening 112a of the case 112 is set within a range of $1 < h1/h2 \leq 1.8$ (desirably, $1.2 \leq h1/h2 \leq 1.6$) with h2 the vertical height of the bottom wall portion 117. This setting is made to suppress the protrusion of the airbag 144 toward the rear of the vehicle and to make it possible to push and open the later-described door portion 134 arranged in the airbag cover 122, smoothly by the protruding airbag 144. If the value of h1/h2 exceeds 1.8, specifically, it is possible to suppress the protrusion of the airbag 144 toward the rear side of the vehicle but impossible to push and open the door portion 134 smoothly by the airbag 144 protruded. As a result, the opening of the door portion 134 may be delayed to elongate the time period from the start to the completion of the inflation of the airbag 144. Here in the case of the embodiment, the height h1 in the vicinity of the case opening 112a is taken as the length of the line extended perpendicularly of the lower wall portion 115 from the opening side end portion 114a of the upper wall portion 114 to the extension line of the lower wall portion 115 (as referred to FIG. 16).

On the outer peripheries of the upper wall portion 114 and the lower wall portion 115, on the other hand, there are fixed a plurality of hooks 119 having a generally C-shaped section. Each hook 119 is curved away from the bottom wall portion 117 that a retaining hook portion 119a on its leading end is removed from the case opening 112a. In the embodiment, four hooks 119 are arranged on both the upper wall portion 114 and the lower wall portion 115 (as referred to FIG. 18). In the right wall portion 117 of the surrounding wall 113, on the other hand, there is formed an insert hole 117a (as referred to FIG. 17) into which the end portion of the later-described body 137 of the inflator 136 can be inserted. In the bottom wall portion 120, there are formed insert holes 120a into which the later-described bolts 138c of the inflator 136 can be inserted. This case 112 is connected to and fixed on the not-shown dash board reinforcement arranged in the vicinity of the column body 4, by means of not-shown brackets.

The airbag cover 122 is made of a thermoplastic elastomer such as polyolefins. And, the airbag cover 122 can cover the case 112 on the rear side of the vehicle.

Moreover, the airbag cover 122 is arranged at the lower panel 110b below the peripheral edge of the column cover 7 in the dash board 110. And, the airbag cover 122 covers the lower periphery of the column cover 7 protruded from the dash board 110. The airbag cover 122 is provided with the door portion 134 for covering the opening 112a of the case 112, and a general portion 124 arranged around the door portion 134.

This door portion 134 is formed into a slightly larger, generally rectangular sheet shape, than that of the opening 112a of the case 112 for covering the opening 112a. At the lower end of the door portion 134, there is arranged a hinge portion 132 for providing a turning center for the door portion 134 to be opened. A thinned breakaway portion 131 is arranged at the inverted U-shape portion of the outer peripheral edges of the door portion 134 other than the hinge portion 132.

At the portions of the general portion 124 near the peripheral edges of the door portion 134, there are arranged four side wall portions 127, 128, 129 and 130, which are protruded at the outer side of the case 112 toward the front of the vehicle. And, the upper side wall portion 127 arranged on the upper side of the case 112 and the lower side wall portion 128 arranged on the lower side of the case 112 are connection wall portions for connecting the airbag cover 122 to the case 112. In the upper side wall portion 127 and the lower side wall portion 128, respectively, there are formed retaining holes 127a and 128a so that the retaining hook portions 119a of the hooks 119 of the case 112 retain the peripheries of the retaining holes 127a and 128a.

At the predetermined positions of the general portion 124, on the other hand, there are formed mounting leg portions 125, which are extended to the front side of the vehicle for attaching and fixing an airbag cover 122 on the lower panel 110b. These mounting leg portions 125 are retained in the peripheral edges of retaining holes 110e of the lower panel 110b. This lower panel 110b is provided with a housing recess 110c for housing the case 112. And, the retaining holes 110e are formed in a flange portion 110d formed on the peripheral edge of the housing recess 110c (as referred to FIG. 17). At the root side of the mounting leg portions 125, on the other hand, there are formed ribs 125a. These ribs 125a abut against the flange portion 110d of the lower panel 110b to support the general portion 124 when the mounting leg portions 125 are retained in the retaining holes 110e.

Figure 17:
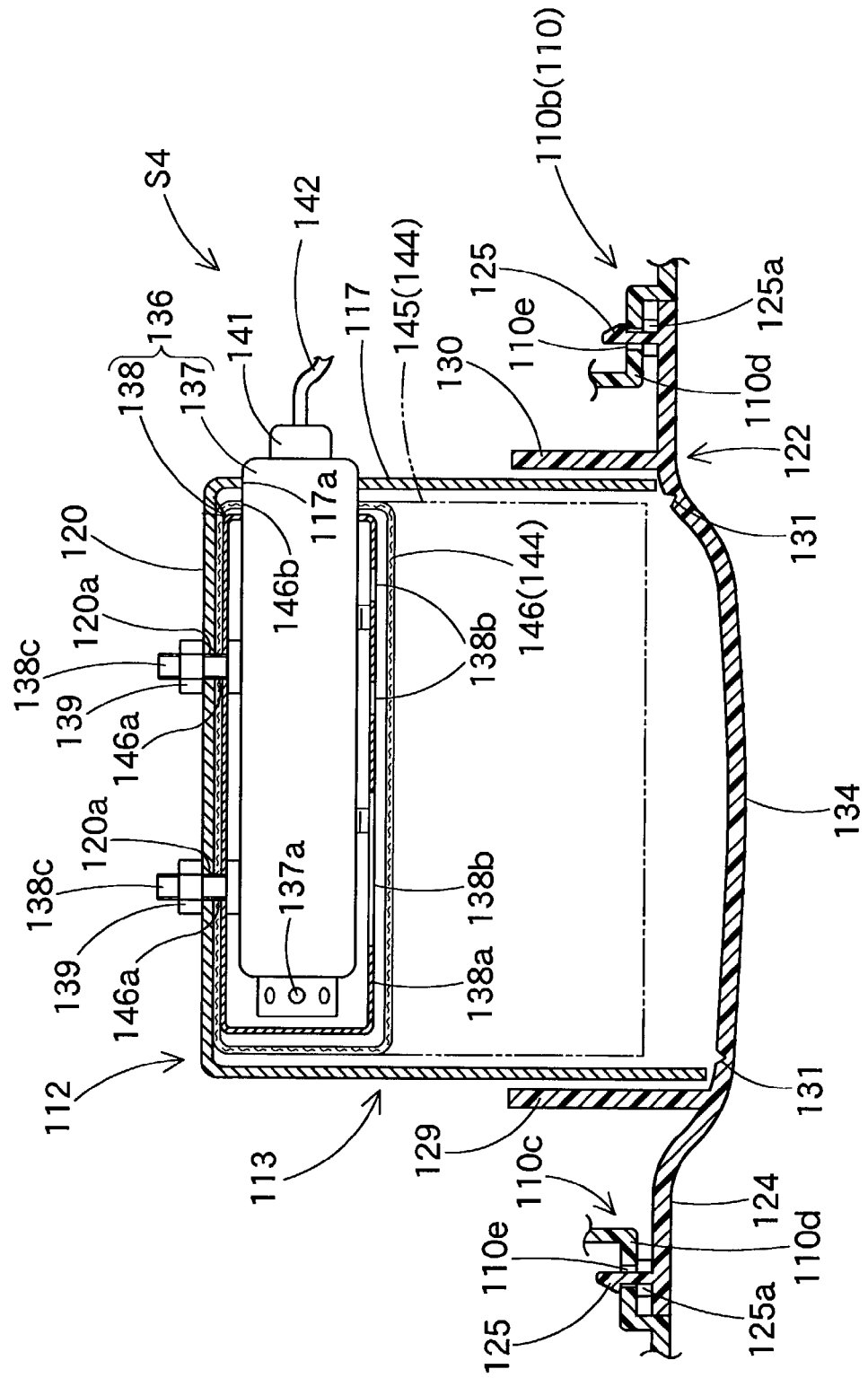
FIG. 17 is a section of a portion cut along the line XVII—XVII of FIG. 16.
Figure 18:
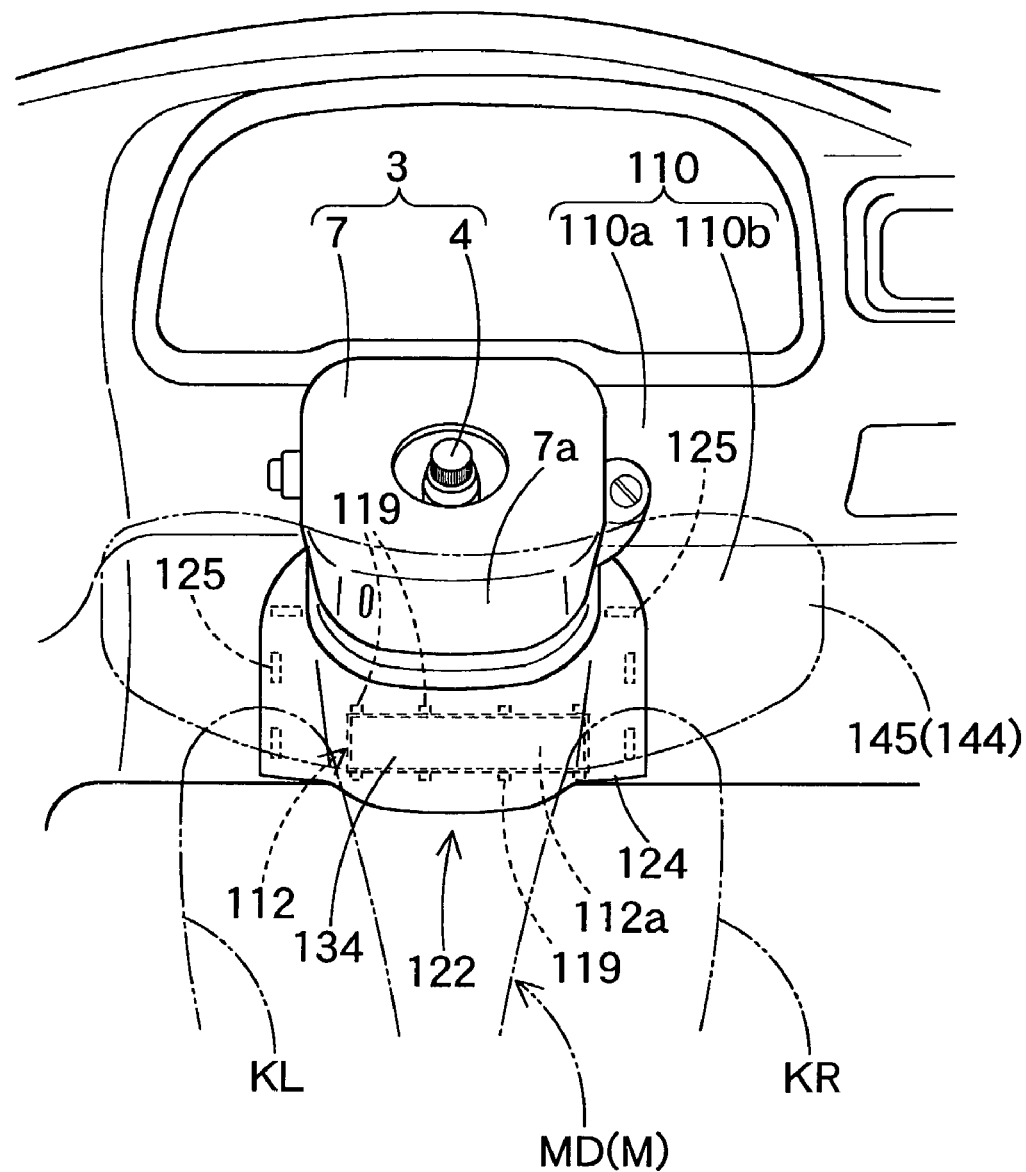
FIG. 18 is a schematic section taken from the rear of the vehicle and showing the used state of the knee protecting airbag device according to the fourth embodiment.

The inflator 136 is formed, as shown in FIGS. 15 to 17, into such a cylinder type as is axially arranged in the transverse direction of the vehicle. The inflator 136 is provided with the generally column-shaped body 137 and a diffuser 138. In one end side of the body 137, there are formed a plurality of gas discharge ports 137a. At the other end side of the body 137, there is connected a connector 141 which has lead wires 142 connected for inputting the activation signal. The diffuser 138 is provided with a generally cylindrical holding cylinder portion 138a made of a sheet metal, and a plurality of (e.g., two in the embodiment) bolts 138c protruded from the holding cylinder portion 138a. In the vehicular rear side face of the holding cylinder portion 138a, there are opened a plurality of gas outlet ports 138b. These gas outlet ports 138b release the inflating gas, as discharged from the gas discharge ports 137a of the body 137, into the airbag 144.

Here, this inflator 136 receives the activation signal together with the not-shown airbag device mounted on the steering wheel 1, through the lead wires 142 when an airbag activation circuit mounted on the vehicle detects a front collision of the vehicle.

Figure 19:
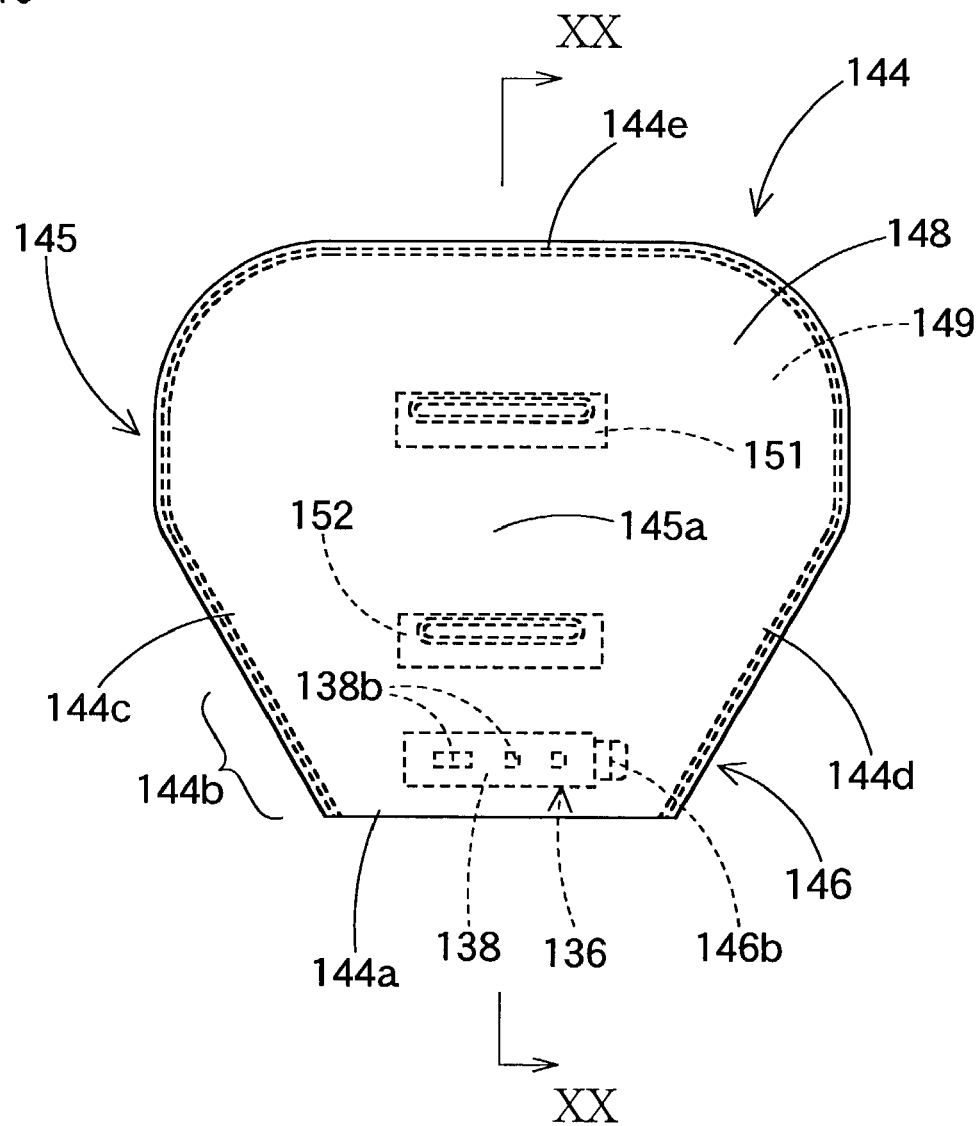
FIG. 19 is a front view of an airbag to be used in the fourth embodiment.
Figure 20:
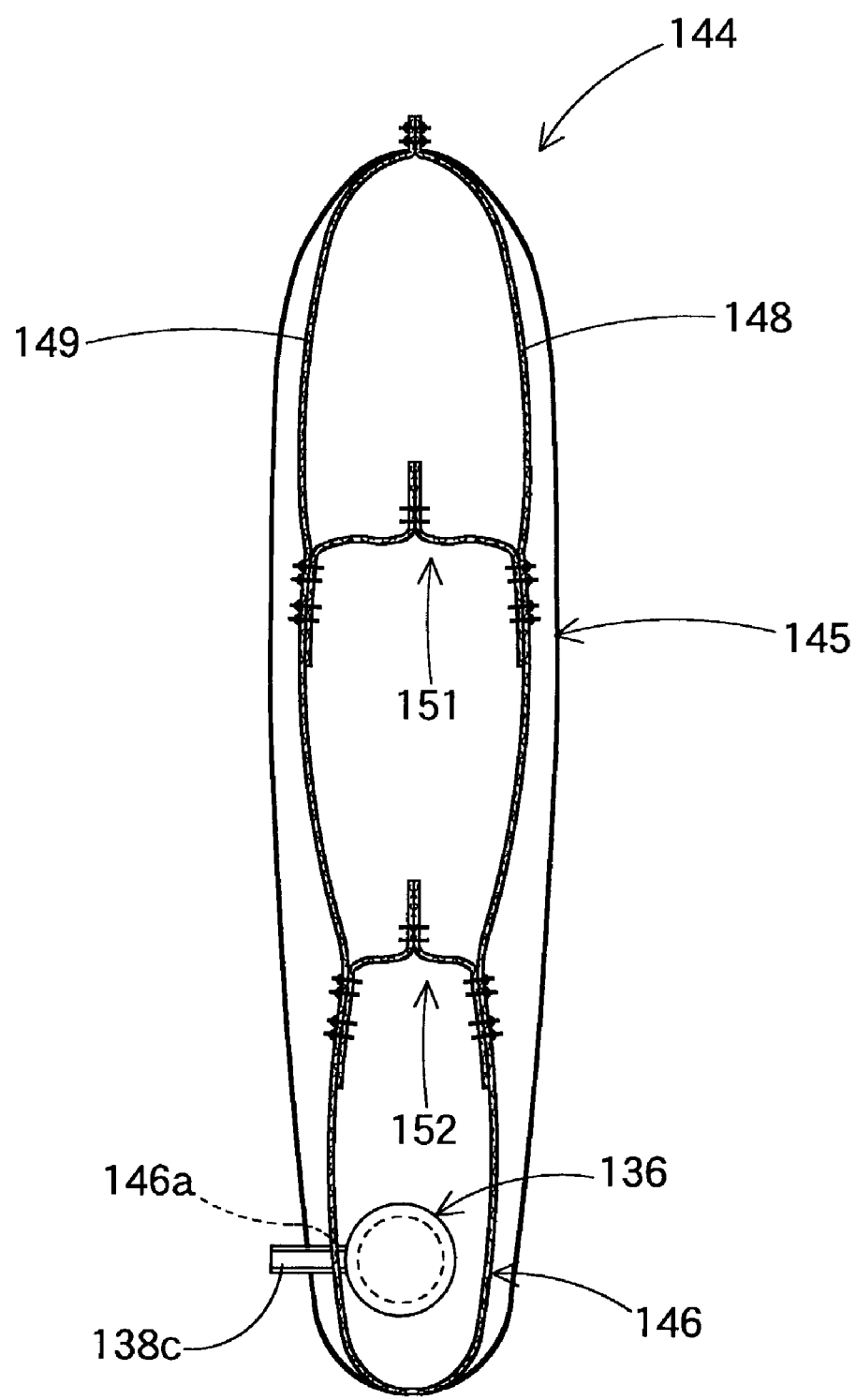
FIG. 20 is an enlarged schematic section of a portion cut along the line XX—XX of FIG. 19.

The airbag 144 is expanded and inflated upward while being protruded from the case 112 to the rear side of the vehicle, when it admits the inflating gas from the inflator 136. The airbag 144 is formed of a woven fabric of flexible polyester or polyamide yarns. The airbag 144 takes a generally rectangular sheet shape, as shown in FIGS. 19 and 20, when it is completely expanded and inflated. And, the airbag 144 is provided with a mounting portion 146 on its lower end side for housing the inflator 136, and a body portion 145 arranged on the upper side of the mounting portion 146. The body portion 145 is formed to have a larger transverse width size than that of the mounting portion 146. This mounting portion 146 is a portion to remain housed in the case 112 when the airbag 144 completes its expansion and inflation. Moreover, the mounting portion 146 is held in the case 112 by making use of the inflator 136. The body portion 145 is protruded from the case opening 112a and is expanded and inflated, when the airbag 144 is expanded and inflated, to protect the knees K (KR and KL) of the driver MD (as referred to FIGS. 15 and 19). Moreover, the body portion 145 can cover the area as far as the upper end 7b on the side of the column cover rear face 7a when the airbag 144 is completely expanded and inflated.

On the other hand, the airbag 144 is formed by folding back the airbag material of a woven fabric at a portion of the lower end 144a of the airbag 144. The airbag 144 is formed by sewing the later-described tethers 150 and 151 to the airbag material and by sewing the peripheral edges of the portions which are opposed to each other by folding back the airbag material. And, the airbag 144 is provided with a passenger side wall portion 148 on the side of the driver MD and a body side wall portion 149 on the side of the column cover 7, these wall portions 148 and 149 having a folding fan shape.

In the mounting portion 146 on the lower side of the body side wall portion 148, there are formed two insert holes 146a and 146a and one insert hole 146b. The individual bolts 138c of the inflator 136 is inserted into the insert holes 146a. The body 137 of the inflator 136 is inserted into the insert hole 146b. In short, the body 37 of the inflator 136 protrudes from the insert hole 146b of the airbag 144. And, the airbag 144 is attached to the case 112 such that the peripheral edges of the individual insert holes 146a are clamped between the holding cylinder portion 138a and the bottom wall portion 120 of the case 112.

In the body portion 145 of the airbag 144, on the other hand, there are arranged at two vertical levels band-shaped tethers 151 and 152, which extend in the transverse direction. These tethers 151 and 152 are so arranged that the body portion 145 may be able to keep the board-like shape without increasing the thickness of the vicinity of a central portion 145a when the airbag 144 is completely expanded and inflated. Therefore, the tethers 151 and 152 are arranged near the central portion 145a of the body portion 145.

Each of the tethers 151 and 152 is made of two pieces of cloth material. Each tether 151 and 152 is formed by sewing one end of one cloth material to the passenger side wall portion 148 and one end of the other cloth material to the body side wall portion 149 and by sewing the other ends of the corresponding cloth materials to each other.

Here will be described how to assemble this airbag device S4. First of all, the peripheral edges of the passenger side wall portion 148 and the body side wall portion 149 and the tethers 151 and 152 are sewn to manufacture the airbag 144. At this time, there is left an unsewn portion 144b (as referred to FIG. 19). Then, the inflator 136 is housed from the unsewn portion 144b, and the individual bolts 138c are protruded from the insert holes 146a. At the same time, the root side portion of the inflator body 137 is protruded from the insert hole 146b. After this, the unsewn portion 144b of the airbag 144 is sewn to complete the airbag 144.

Figure 21A:
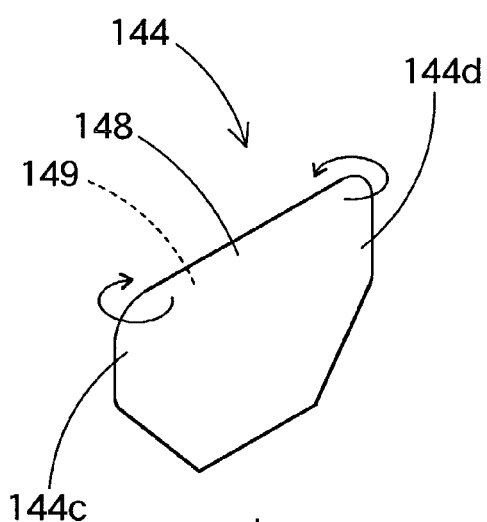
FIGS. 21A to 21D are schematic diagrams showing the steps of folding the airbag of the fourth embodiment.
Figure 21B:
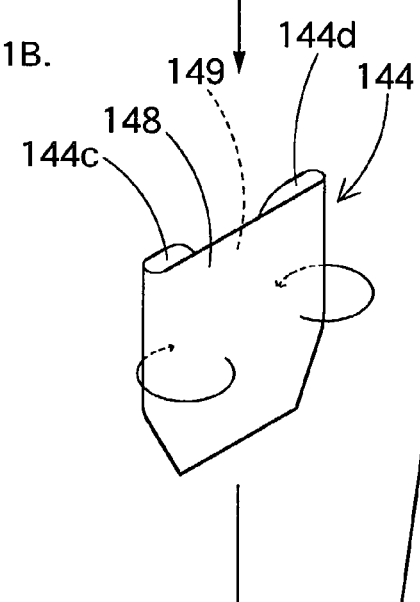
Figure 21C:
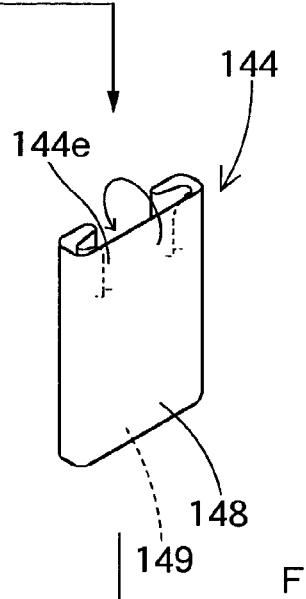
Figure 21D:
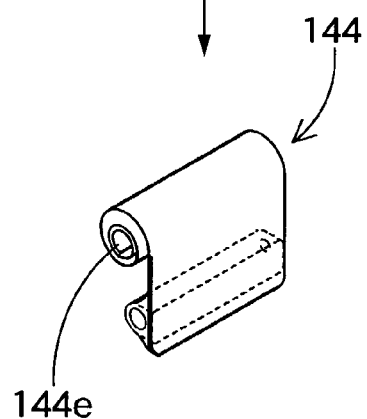

Next, the airbag 144 is folded. In the case of the embodiment, the airbag 144 is laid out flat with the passenger side wall portion 148 over the body side wall portion 149, as shown in FIG. 21A. As shown in FIGS. 21B and 21C, the airbag 144 is longitudinally folded to a width size capable of housing it in the case 112, by folding back the two left and right edges 144c and 144d to the body side wall portion 149. After this, the longitudinally folded airbag 144 is folded by rolling its upper edge 144e over the body side wall portion 149, as shown in FIG. 21D. Thus, the transverse folding step is completed to complete the folding works of the airbag 144.

And, the airbag 144 is wrapped, after being folded up, with not-shown breakable wrapping film for preventing the airbag 144 from unfolding. Here, the bolts 138c of the inflator 136 and the end portion of the body 137, protruded from the insert holes 146a and 146b, are further protruded from the wrapping film.

Next, the individual bolts 138c of the inflator 136 are protruded from the insert holes 120a of the case 112. Simultaneously with this, the end portion of the inflator body 137 is protruded from the insert hole 117a of the case 112, and the inflator 136 is housed together with the folded airbag 144 in the case 112. After this, the nuts 139 are fastened on the individual bolts 138c. Then, the inflator 136 and the airbag 144 can be housed in and attached to the case 112.

After this, the not-shown brackets of the case 112 are attached to the dash board reinforcement of the vehicle, to which the upper panel 110a and the lower panel 110b have already been attached. And, the connector 141 connected the lead wires 142 are connected is connected with the body 137 of the inflator 136. Next, the airbag cover 122 is pushed toward the front of the vehicle to insert and retain the individual mounting leg portions 125 in the retaining holes 110e of the lower panel 110b. Simultaneously with this, the retaining hook portions 119a of the hooks 119 of the case 112 are retained in the individual retaining holes 127a and 128a of the upper side wall portion 127 and the lower side wall portion 128. Thus, the airbag device S4 can be mounted on the vehicle by connecting the airbag cover 122 to the case 112.

After the airbag device S4 is mounted on the vehicle, the inflating gas is discharged from the gas discharge ports 137a of the inflator 136 if the activation signal is inputted to the body 137 of the inflator 136. And, the inflating gas flows into the body portion 145 of the airbag 144 through the gas outlet ports 138b of the diffuser 138. And, the airbag 144 is inflated to break the not-shown wrapping film and to push the door portion 134 of the airbag cover 122 thereby to break the breakaway portion 131, so that the door portion 134 is opened downward turning on the hinge portion 132. As a result, the airbag 144 is greatly expanded and inflated upward along the steering column cover lower face 7a, as indicated by the double-dotted lines in FIGS. 15 and 18.

In the airbag device S4 of the fourth embodiment, moreover, the airbag 144 is inflated at first in the case 112 when the inflating gas flows into the airbag 144 from the inflator 136. After this, the airbag 144 is protruded to the rear of the vehicle from the case opening 112a while pushing the case surrounding wall portion 113.

In the airbag device S4 of the fourth embodiment, moreover, the case 112 is so expanded at the opening 112a that the vertical height h1 near the opening 112a is larger than the vertical height size h2 of the bottom wall portion 120. Therefore, the airbag 144 is protruded from the case 112 toward the rear of the vehicle from the case opening 112a while being unfolded in the case 112. In short, in the airbag device S4 of the fourth embodiment, the airbag 144 can be protruded from the case opening 112a while suppressing the rise in its internal pressure. As compared with the case in which the airbag is housed in the case having no expanded opening side, therefore, the airbag 144 can be expanded and inflated at a low protruding velocity toward the rear of the vehicle to suppress the protrusion toward the rear of the vehicle. As a result, the airbag 144 can be expanded and inflated in the state suppressing the protrusion toward the rear of the vehicle, even in the case of the airbag device S4, in which the case 112 is arranged to have an axial direction O1 close to the horizontal direction. And, the knees K (KL and KR) of the driver MD as the passenger M can be protected by the inflated airbag 144, as shown by the double-dotted lines in FIGS. 15 and 18.

In the knee protecting airbag device S4 of the fourth embodiment, therefore, the airbag 144 can be protruded toward the rear of the vehicle from the case 112 while being suppressed from protruding directly at the passenger. And, the airbag 144 can be expanded and inflated upward as smoothly as possible.

In the fourth embodiment, on the other hand, the vertical height h1 in the vicinity of the opening 112a of the case 112 is set within the range of $1 < h1/h2 \leq 1.8$ (desirably, $1.2 \leq h1/h2 \leq 1.6$) with h2 the vertical height of the bottom wall portion 117. Therefore, the airbag 144 can be protruded to the rear of the vehicle from the case 112 while the protrusion toward the passenger is suppressed. At the same time, moreover, the door portion 134, as formed in the airbag cover 122 for covering the vehicular rear side of the case 112, can be smoothly pushed and opened by the airbag 144 protruded. As a result, the airbag 144 can be smoothly expanded and inflated.

In the airbag device S4 of the fourth embodiment, on the other hand, the lower wall portion 115 of the case surrounding wall portion 113 is arranged to be at its opening side portion 115a higher than at its bottom wall portion 115b. Therefore, the airbag 144 is easily expanded and inflated upward because it is guided by the lower wall portion 115 of the case surrounding wall portion 113. As a result, the airbag 144 can be expanded along the lower face 7a of the column cover 7 acting as the body side member.

Figure 22:
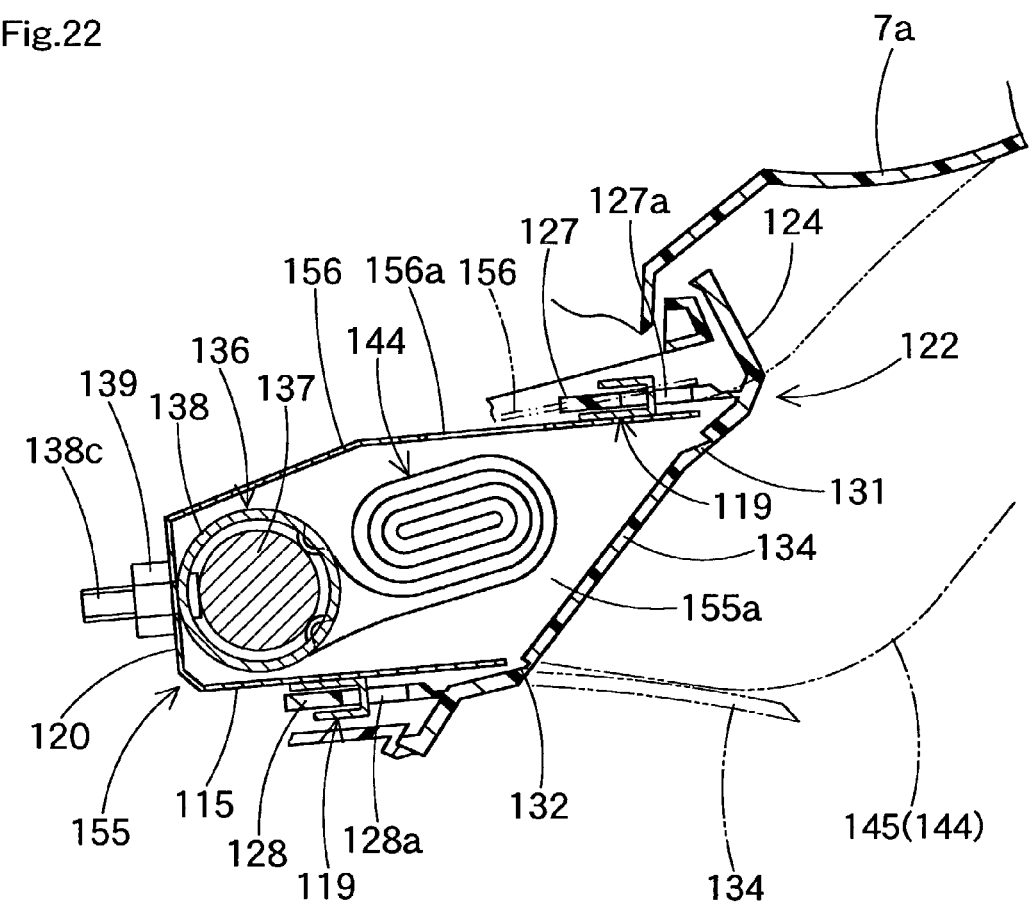
FIG. 22 is an enlarged schematic section taken in the vehicular longitudinal direction of the case, in which a modified case is used in the knee protecting airbag device of the fourth embodiment.

Here in the fourth embodiment, the case 112 is exemplified by the construction in which the side of the opening 112a is expanded before the airbag 144 is inflated. The construction of the case should not be limited thereto but may be modified into a case 155, in which an upper wall portion 156 can be so deformed that the side of an opening is expanded when the airbag 144 is expanded and inflated, as shown in FIG. 22. The case 155 has a construction similar to that of the aforementioned case 112 excepting the upper wall portion 156. Therefore, similar portions will be omitted from description, designating them by the same reference numerals. In the upper wall portion 156 of the case 155, as indicated by the double-dotted lines in FIG. 22, there are formed a plurality of holes 156a which are pushed by the airbag 144 when it is inflated, to deform and expand the opening 155a side of the upper wall portion 155.

Here, this case 155 is constructed to deform the upper wall portion 156 by arranging the holes 156a in the upper wall portion 156. The shape of the case should not be limited thereto but may be modified such that the rigidity of the lower wall portion 115 can be enhanced to deform the upper wall portion 156 by arranging a reinforcing member or the like on the lower wall portion 115.

Figure 23:
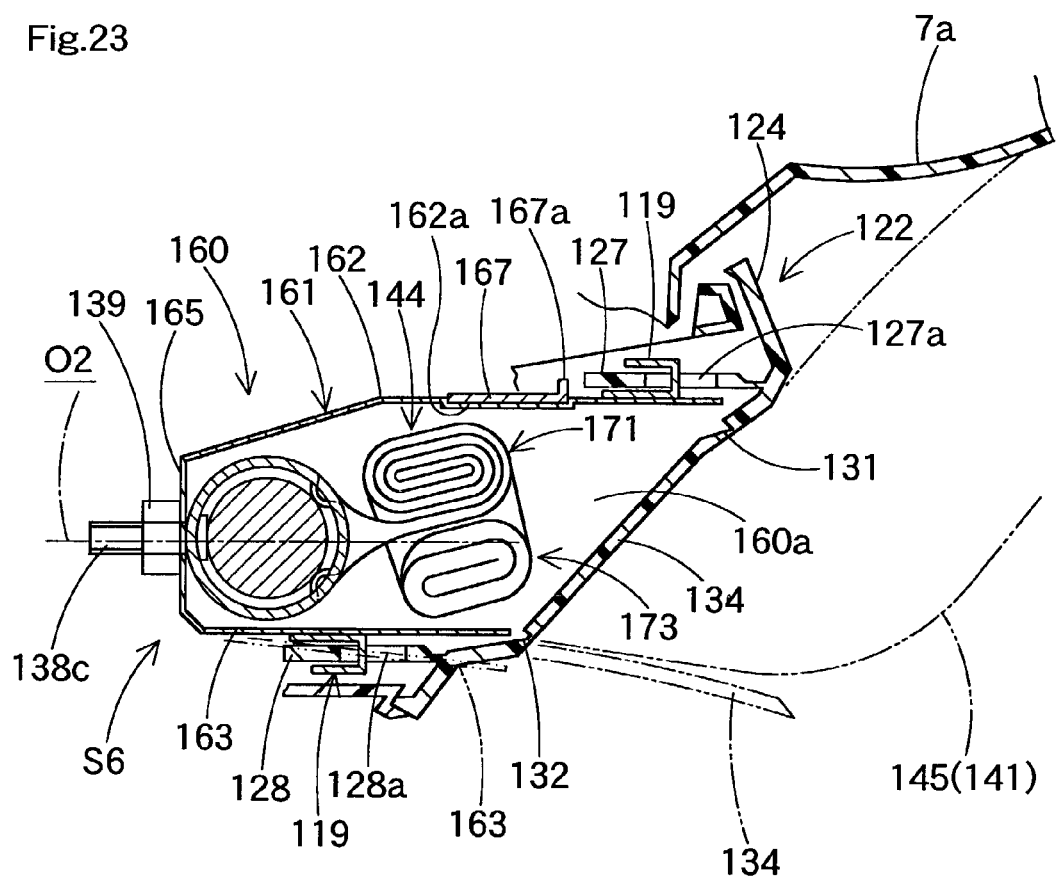
FIG. 23 is an enlarged schematic section taken in the longitudinal direction of a vehicle and showing a knee protecting airbag device according to a fifth embodiment.

Here will be described the airbag device S5 of the fifth embodiment. As shown in FIG. 23, the airbag device S5 has a construction similar to that of the aforementioned airbag device S4 of the fourth embodiment excepting a case 160 and the folded shape of the airbag 144 to be housed in the case 160. Therefore, similar portions will be omitted from description, designating them by the same reference numerals.

Figure 24:
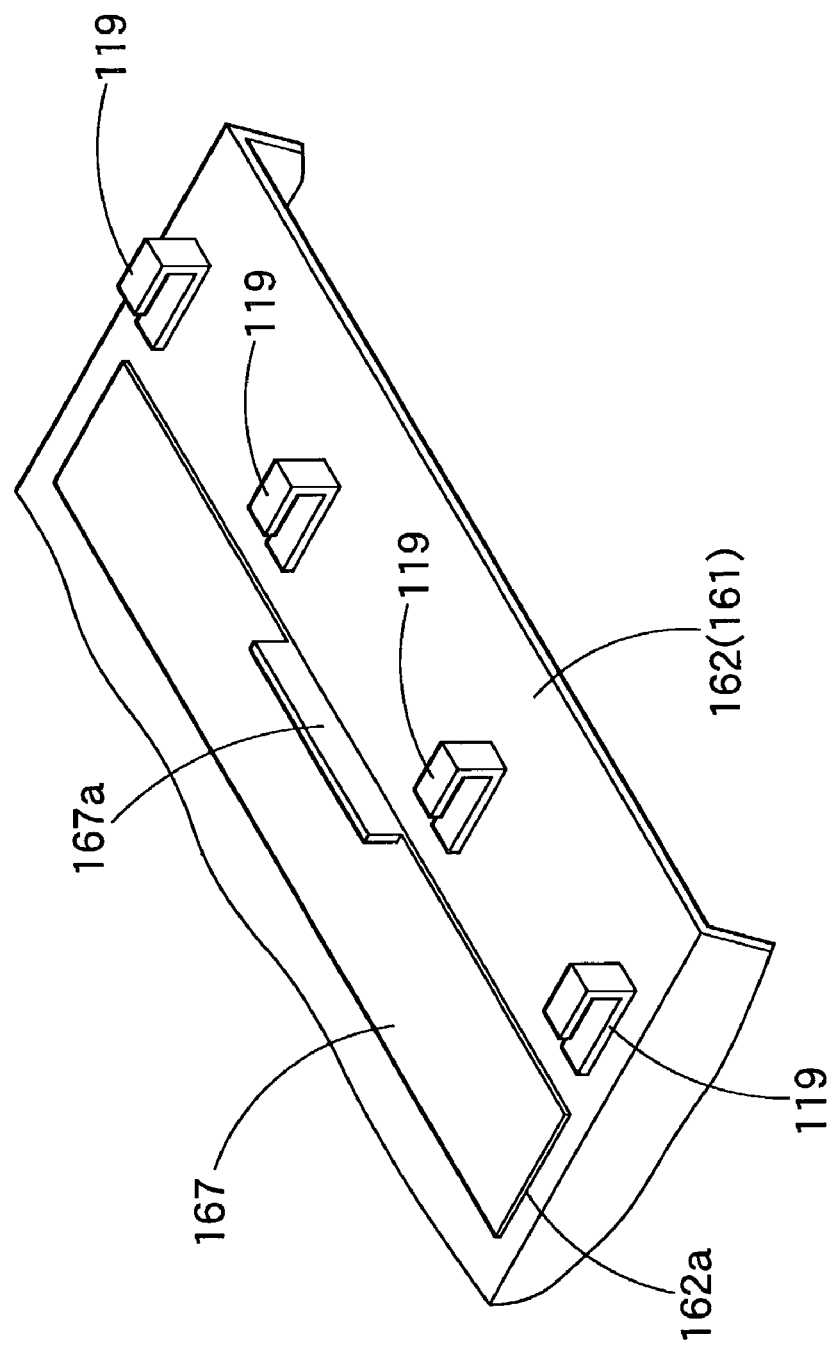
FIG. 24 is an enlarged perspective view showing a portion of a case to be used in the fifth embodiment.

Like the case 112 in the aforementioned airbag device S4, the case 160 is provided with a surrounding wall portion 161 of a generally square tube shape opened on the vehicular rear side, and a bottom wall portion 165 for closing the surrounding wall portion 161 on the vehicular front side. And, the case 160 is so arranged as to have an axial direction O2 generally in the horizontal direction (as referred to FIG. 23). On the upper wall portion 162 of the surrounding wall portion 161, moreover, there is arranged a reinforcing plate 167 which extends substantially over the whole transverse width for enhancing the rigidity of the upper wall portion 162. This reinforcing plate 167 is fixed in a recess 162a formed in the upperwall portion 162. In the vicinity of the transverse center of the reinforcing plate 167, there is formed a reinforcing rib 167a which is protruded upward (as referred to FIGS. 23 and 24). In the case 160 of the embodiment, specifically, by enhancing the rigidity of the upper wall portion 162, the lower wall portion 163 of the surrounding wall portion 161 can be so deformed, when the airbag 144 is expanded and inflated, as to enlarge the vertical height near the case opening 160a (as shown in the double-dotted lines of FIG. 23). On the upper wall portion 162 and the lower wall portion 163, moreover, there are fixed a plurality of hooks 119 as in the aforementioned case 112 in the fourth embodiment.

The airbag 144 is folded up as shown in FIGS. 25A to 25D. First of all, the airbag 144 is expanded flat with the passenger side wall portion 148 and the body side wall portion 149 being overlapped, as shown in FIG. 25A. After this, the two transverse edges 144c and 144d are folded under the passenger side wall portion 148, as shown in FIG. 25B. Next, the side of the upper edge 144e of the airbag 144 is rolled making transverse fold lines toward the body side wall portion 149, as shown in FIGS. 25B and 25C, to form a first folded portion 171. After this, two left and right edges 171a and 171b of the first folded portion 171 are folded to the side of the passenger side wall portion 148 (the lower side) of a central portion 171c of the first folded portion 171, as shown in FIG. 25D, to form second folded portions 173 and 173. At this time, the airbag 144 is folded with such a width that it can be housed in the case 160. This completes the folding of the airbag 144.

In the airbag device S5 thus constructed, the lower wall portion 163 of the surrounding wall portion 161 is deformed if the airbag 144 is inflated at the initial stage to push the upper wall portion 162 and the lower wall portion 163 of the case surrounding wall portion 161 while unfolding the second folded portions 173 and 173 on the two transverse edge sides. And, the airbag 144 is protruded to the rear of the vehicle from the case opening 160a while being unfolded in the deformed case 160. Therefore, the airbag 144 can be protruded from the case opening 160a while suppressing rise in its internal pressure. At this time, moreover, the case 160 is not deformed to reduce the transverse width size of the vicinity of the opening 160a. Therefore, the airbag 144 is protruded in a transversely wide state from the case opening 160a while unfolding the second folded portions 173 and 173 of the two left and right edge sides (as referred to FIGS. 26A and 26B). In short, the airbag 144 is protruded, while being widened in the transverse direction, from the case opening 160a with a lowered the vehicular rearward protruding velocity to suppress the protrusion toward the rear of the vehicle. Even in the case of the airbag device S5 in which the axial direction O2 of the case 160 is arranged generally in the horizontal direction, therefore, the airbag 144 can be expanded and inflated while suppressing the protrusion toward the rear of the vehicle.

In the knee protecting airbag device S5 of the fifth embodiment, therefore, the airbag 144 can also be protruded to the rear of the vehicle from the case 160 while suppressing the protrusion toward the passenger side. And, the airbag 144 can be expanded and inflated upward as smoothly as possible.

In the knee protecting airbag device S5 of the fifth embodiment, moreover, the airbag 144 is folded such that its second folded portions 173 and 173 are folded on the lower side of the central portion 171c of the first folded portion 171. And, the lower wall portion 163 in the case surrounding wall portion 161 is deformed. At the initial stage of inflation of the airbag 144, specifically, the lower wall portion 163 of the case 160 is deformed when it is pushed by the second folded portions 173 and 173. Therefore, the airbag 144 unfolds the second folded portions 173 and 173 quickly as a result of the deformation of the lower wall portion 163. As a result, the airbag 144 can be quickly expanded and inflated. Of course if this point is not considered important, a case having the construction in which the upper wall portion of the surrounding wall portion is deformed may be employed to house the airbag having the second folded portions folded on the lower side.

Figure 26A:
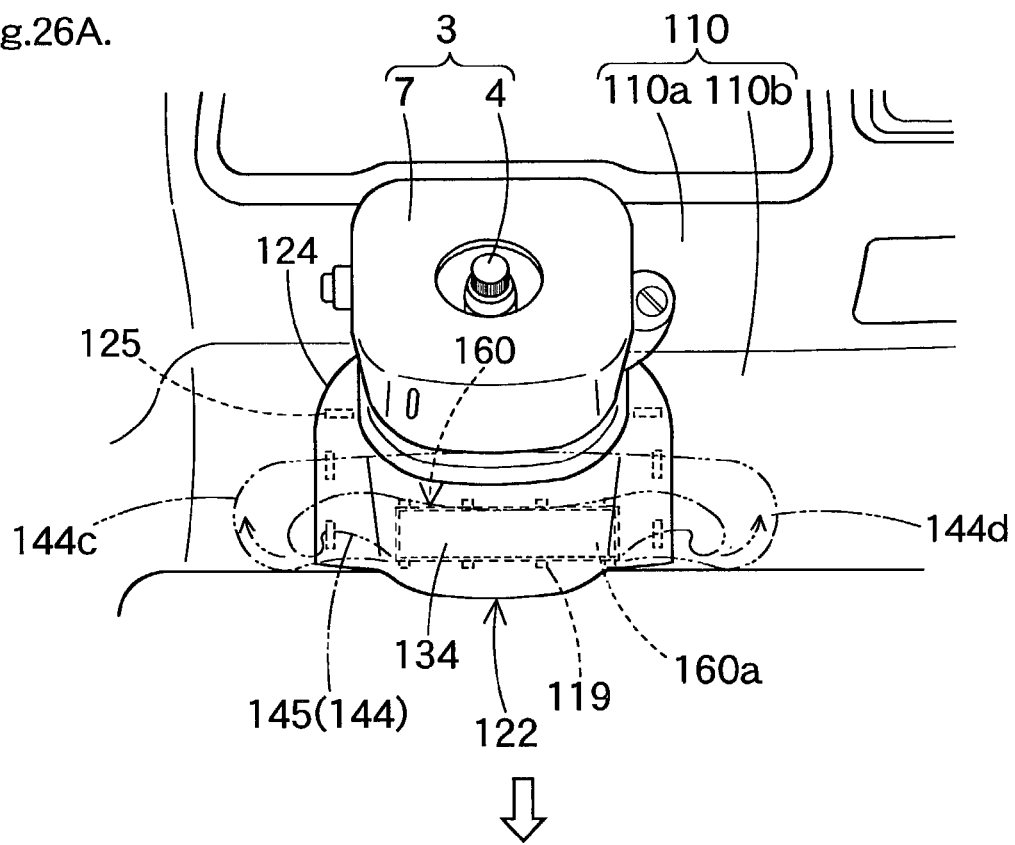
FIGS. 26A and 26B are schematic front views taken from the rear of the vehicle and showing the expanded and inflated state of the airbag in the knee protecting airbag device of the fifth embodiment.
Figure 26B:
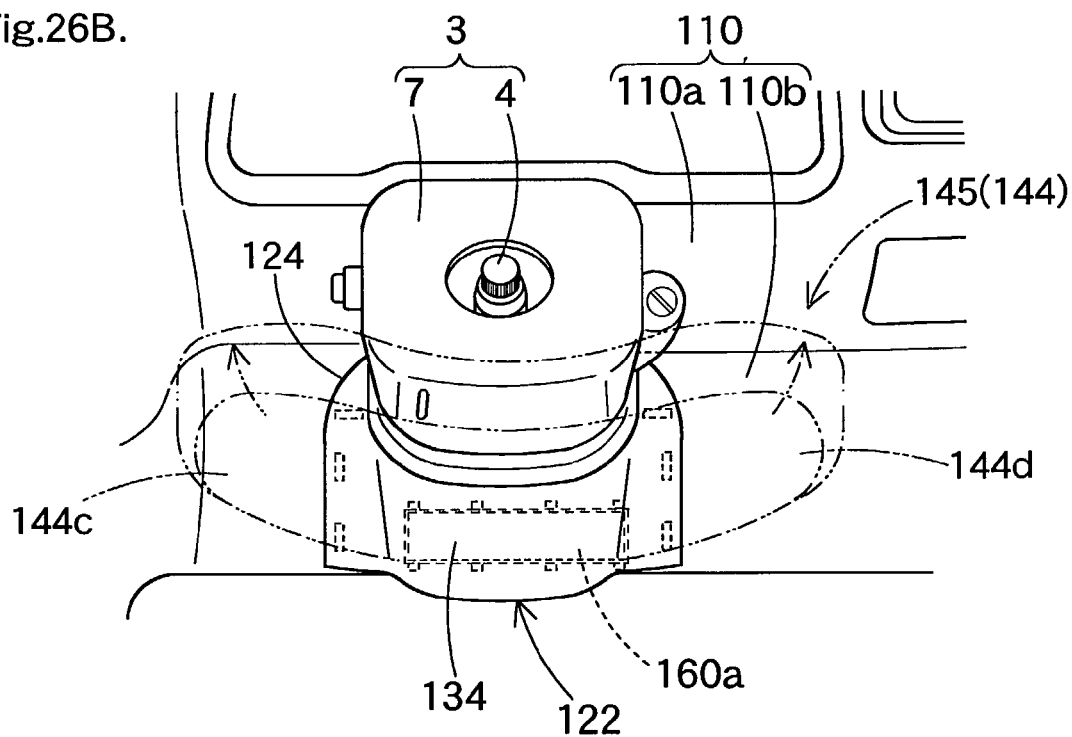

In the airbag device S5 of the fifth embodiment, moreover, the airbag 144 is folded such that the two transverse edges 171a and 171b of the first folded portion 171 are folded on the lower side near the central portion 171c of the first folded portion 171. At the initial stage of the expansion and inflation of the airbag 144, therefore, the central portion 171c of the first folded portion 171 is regulated by the second folded portions 173 and 173 so that it is prevented as much as possible from being inflated upward, till the two second folded portions 173 and 173 folded on the lower side are turned upward and unfolded to restore the position transversely flush with the central portion 171c of the first folded portion 171. In other words, the first folded portion 171 is unfolded generally uniformly throughout the transverse direction of the airbag 144, after the second folded portions 173 and 173 are generally flush in the transverse direction with the central portion 171c of the first folded portion 171. As shown in FIGS. 26A and 26B, therefore, the airbag 144 can be expanded in a transversely more extended state. If this point is not considered important, the airbag 144 may naturally be folded such that the second folded portions 173 and 173 are folded on the upper side in the vicinity of the central portion 171c of the first folded portion 171.

Here in the case 160 of the fifth embodiment, the lower wall portion 163 is deformed by arranging the reinforcing plate 167 on the upper wall portion 162 to enhance rigidity. The construction of the case should not be limited thereto but may be modified such that the lower wall portion is deformed by forming a fragile portion, for example holes, in the lower wall portion to lower the rigidity.

Moreover, the case may naturally be constructed such that the upper wall portion is deformed. In case the airbag device S5 is arranged in front of the driver's seat, however, a component such as the steering shaft of the vehicle body is arranged close to the upper side of the case. In case the upper wall portion of the case is made deformable, specifically, the deformed upper wall portion may interfere with the steering shaft. It is, therefore, desirable that the lower wall portion is deformed.

Here in the aforementioned airbag devices S1 to S6 of the embodiments, the door portions 31 and 134 for covering the openings of the cases 13, 112, 155 and 160 is exemplified by the door portions 31 and 134 which are constructed to have the breakaway portions 29 and 131 of an inverted U-shape on the outer peripheral edge so that it is opened downward. However, the shape of the door portion should not be limited thereto but may be modified such that two door portions to be opened upward and downward are arranged by covering the opening of the case with generally H-shaped breakaway portions, for example.

Moreover, the fourth and fifth embodiments have been described using as examples the airbag devices S4 and S5 which are arranged on the vehicular body side or on the front side of the driver MD of the vehicle so as to protect the knees K of the driver MD. The knee protecting airbag devices S4 and S5 having the construction of the fourth or fifth embodiment may also be arranged on the front side of the passenger's seat so as to protect the knees of the passenger seated on the passenger's seat.

What is claimed is:

1. A knee protecting airbag device,
   wherein a knee protecting airbag is folded and housed in a case arranged in front of the knees of a seated passenger and is protruded toward the rear of a vehicle from said case when an inflating gas flows in, so that the airbag is expanded and inflated upward while being unfolded,
   wherein said case is provided with a surrounding wall portion of a generally square tube shape opened on the rear side of the vehicle, and a bottom wall portion closing the vehicular front side of said surrounding wall portion, said surrounding wall portion defining an opening opposite to the bottom wall portion,
   wherein said case has a height near the opening larger than the height of said bottom wall portion and the case is expanded toward a leading edge of said opening when said airbag is expanded and inflated;
   wherein an upper wall portion in said case surrounding wall portion can be deformed to expand said case opening when said airbag is expanded and inflated;
   wherein a distance between an upper wall portion of said surrounding wall portion and a lower wall portion of said surrounding wall portion does not decrease from the bottom wall portion to the opening; and
   wherein an airbag cover is arranged to cover the vehicular rear of said case, the airbag cover including a door portion covering said opening, the door portion opening to protrude said airbag when said airbag is inflated, a door opening made by the door portion when opened having a width along the vertical direction larger than a width of the bottom wall portion in the vertical direction.

2. A knee protecting airbag device according to claim 1, wherein the lower wall portion of said case surrounding wall portion is arranged so that an opening side end thereof is higher than a bottom wall portion side end thereof.

3. A knee protecting airbag device according to claim 1, wherein a ratio of the height near the opening to a height of the bottom wall portion is in the range of $1 < h1/h2 \leq 1.8$, where h1 is the height near the opening and h2 is the height of the bottom wall portion.

4. A knee protecting airbag device according to claim 1, wherein a ratio of the height near the opening to a height of the bottom wall portion is in the range of $1.2 < h1/h2 \leq 1.6$, where h1 is the height near the opening and h2 is the height of the bottom wall portion.

5. A knee protecting airbag device,
   wherein a knee protecting airbag folded is housed in a case arranged in front of the knees of a seated passenger and is protruded toward the rear of the vehicle from said case when an inflating gas flows in, so that it is expanded and inflated upward while being unfolded, and wherein said case is provided with a surrounding wall portion of a generally square tube shape opened on the rear side of the vehicle, and a bottom wall portion closing the vehicular front side of said surrounding wall portion, said surrounding wall portion defining an opening opposite to the bottom wall, wherein said airbag is folded in one direction, creating transverse fold lines such that an upper edge of the airbag approaches an inflator edge of an airbag to form a first folded portion, and then the two side edges of the airbag, which are transverse to the transverse fold lines, are folded either over the upper side or beneath the lower side and toward a central portion of the first folded portion, to form second folded portions; the second folded portions being arranged in said case along the transverse direction, each second folded portion and the central portion being arranged along the vertical direction and then substantially along an opening face of the case, wherein said case is made deformable at the upper wall portion or the lower wall portion of said case surrounding wall portion so that the height in the vicinity of the opening may be enlarged when said airbag is expanded and inflated, wherein a distance between the upper wall portion and the lower wall portion does not decrease from the bottom wall portion to the opening, and wherein an airbag cover is arranged to cover the vehicular rear of said case, the airbag cover including a door portion covering said opening, the door portion opening to protrude said airbag when said airbag is inflated, a door opening made by the door portion when opened having a width along the vertical direction larger than a width of the bottom wall portion in the vertical direction.

6. A knee protecting airbag device according to claim 5, wherein the wall portion, as located on the folding side of the two edges of said airbag, in said case surrounding wall portion is made deformable.

7. A knee protecting airbag device according to claim 6, wherein said airbag is folded such that the two transverse edge sides are folded beneath the lower side near the central portion of the folded portion.

8. A knee protecting airbag device according to claim 5, wherein a ratio of a height near the opening to a height of the bottom wall portion is in the range of $1 < h1/h2 \leq 1.8$, where h1 is the height near the opening and h2 is the height of the bottom wall portion.

9. A knee protecting airbag device according to claim 5, wherein a ratio of a height near the opening to a height of the bottom wall portion is in the range of $1.2 < h1/h2 \leq 1.6$, where h1 is the height near the opening and h2 is the height of the bottom wall portion.

* * * * *